United States Patent
Paluri et al.

(10) Patent No.: US 12,323,619 B2
(45) Date of Patent: Jun. 3, 2025

(54) VIDEO OR IMAGE CODING ON BASIS OF CONDITIONALLY PARSED ALF MODEL AND RESHAPING

(71) Applicant: LG ELECTRONICS INC., Seoul (KR)

(72) Inventors: Seethal Paluri, Seoul (KR); Seunghwan Kim, Seoul (KR); Jie Zhao, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/533,628

(22) Filed: Dec. 8, 2023

(65) Prior Publication Data

US 2024/0121434 A1    Apr. 11, 2024

Related U.S. Application Data

(63) Continuation of application No. 17/435,656, filed as application No. PCT/KR2020/003103 on Mar. 5, 2020, now Pat. No. 11,889,111.

(60) Provisional application No. 62/814,856, filed on Mar. 6, 2019.

(51) Int. Cl.
| | |
|---|---|
| *H04N 19/593* | (2014.01) |
| *H04N 19/11* | (2014.01) |
| *H04N 19/117* | (2014.01) |
| *H04N 19/132* | (2014.01) |
| *H04N 19/176* | (2014.01) |
| *H04N 19/186* | (2014.01) |
| *H04N 19/30* | (2014.01) |
| *H04N 19/85* | (2014.01) |

(52) U.S. Cl.
CPC ........... *H04N 19/593* (2014.11); *H04N 19/11* (2014.11); *H04N 19/117* (2014.11); *H04N 19/132* (2014.11); *H04N 19/176* (2014.11); *H04N 19/186* (2014.11); *H04N 19/30* (2014.11); *H04N 19/85* (2014.11)

(58) Field of Classification Search
CPC .... H04N 19/593; H04N 19/11; H04N 19/117; H04N 19/132; H04N 19/176; H04N 19/186; H04N 19/30; H04N 19/85; H04N 19/463; H04N 19/70; H04N 19/82
See application file for complete search history.

(56) References Cited

U.S. PATENT DOCUMENTS

| | | | | |
|---|---|---|---|---|
| 2017/0085889 | A1* | 3/2017 | Baylon | H04N 19/98 |
| 2018/0167637 | A1* | 6/2018 | Yin | H04N 19/30 |
| 2021/0258598 | A1* | 8/2021 | Hendry | H04N 19/117 |
| 2021/0392381 | A1* | 12/2021 | Wang | H04N 19/117 |

OTHER PUBLICATIONS

Versatile Video Coding (Draft 4) "Benjamin Bross, Jianle Chen, Shan Liu; JVET; Jan. 9-18, 2019" (document is too large to attach) ( Year: 2019).*

* cited by examiner

*Primary Examiner* — Jared Walker
(74) *Attorney, Agent, or Firm* — BRYAN CAVE LEIGHTON PAISNER LLP

(57) ABSTRACT

According to the disclosure of the present document, reshaper data and/or an ALF parameter can be signaled adaptively from a parameter set, thereby reducing the amount of data to be signaled for video/image coding and improving coding efficiency.

15 Claims, 17 Drawing Sheets

(a)

(b)

VIDEO OR IMAGE CODING ON BASIS OF CONDITIONALLY PARSED ALF MODEL AND RESHAPING

This application is a continuation application of U.S. patent application Ser. No. 17/435,656, filed on Sep. 1, 2021, which is a National Stage Entry of International Application No. PCT/KR2020/003103, filed on Mar. 5, 2020, which claims the benefit of U.S. Provisional Application No. 62/814,856, filed on Mar. 6, 2019, the contents of which are all hereby incorporated by reference herein in their entirety.

BACKGROUND OF THE DISCLOSURE

Field of the disclosure

The present document relates to video or image coding on basis of conditionally pared ALF model and reshaping model.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

In addition, there is a discussion on techniques such as luma mapping with chroma scaling (LMCS) and adaptive loop filtering (ALF) to improve compression efficiency and increase subjective/objective visual quality. In order to efficiently apply these techniques, there is a need for a method for efficiently signaling related information.

SUMMARY

According to an embodiment of the present document, a method and an apparatus for increasing image coding efficiency are provided.

According to an embodiment of the present document, an efficient filtering application method and apparatus are provided.

According to an embodiment of the present document, an efficient LCMS application method and apparatus are provided.

According to an embodiment of the present document, a method and an apparatus for hierarchically signaling ALF related information are provided.

According to an embodiment of this document, a method and an apparatus for hierarchically signaling LMCS related information are provided.

According to an embodiment of the present document, LMCS data may be conditionally signaled through APS, and APS ID information indicating the ID of the referenced APS may be signaled through header information (tile group header, picture header or slice header).

According to an embodiment of the present document, ALF data may be conditionally signaled through APS, and APS ID information indicating the ID of the referenced APS may be signaled through header information (tile group header, picture header or slice header).

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

Advantageous Effects

According to an embodiment of the present document, overall image/video compression efficiency may be improved.

According to an embodiment of the present document, subjective/objective visual quality may be improved through efficient filtering.

According to an embodiment of the present document, ALF and/or LMCS may be adaptively applied in units of pictures, slices, and/or coding blocks.

According to an embodiment of the present document, ALF related information can be efficiently signaled.

According to an embodiment of the present document, LMCS related information can be efficiently signaled.

DESCRIPTION OF EXEMPLARY EMBODIMENTS

Figure 1:
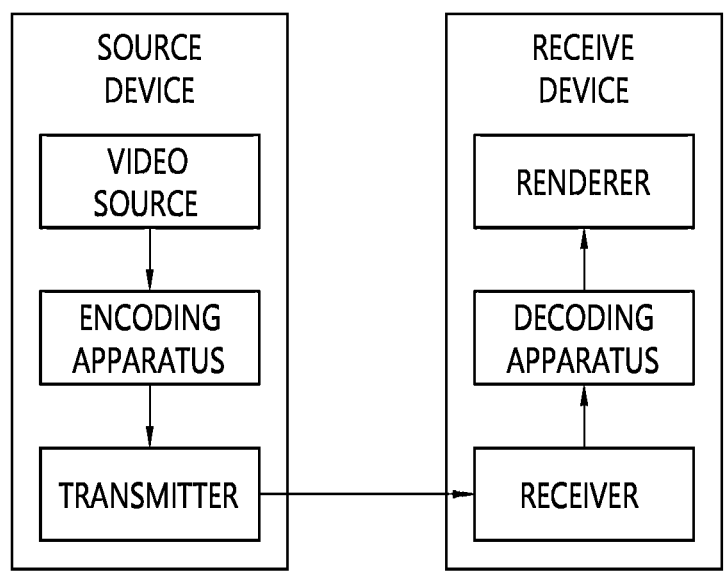
FIG. 1 illustrates an example of a video/image coding system to which the embodiments of the present document may be applied.

The present document may be modified in various forms, and specific embodiments thereof will be described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. Embodiments in which each component is integrated and/or separated are also included in the scope of the disclosure of the present document.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into a multiple bricks, each of which may be constructed with one or more CTU rows within the tile. A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. In the present document, a tile group and a slice may be used in place of each other. For example, in the present document, a tile group/tile group header may be referred to as a slice/slice header.

Meanwhile, one picture may be divided into two or more subpictures. A subpicture may be a rectangular region of one or more slices within a picture.

A pixel or a pa may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, "A or B" may mean "only A", "only B" or "both A and B". In other words, "A or B" in the present document may be interpreted as "A and/or B". For example, in the present document "A, B or C (A, B or C)" means "only A", "only B", "only C", or "any combination of A, B and C".

A slash (/) or comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". Also, in the present document, the expression "at least one of A or B" or "at least one of A and/or B" may be interpreted the same as "at least one of A and B".

Also, in the present document, "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present document may mean "for example". Specifically, when "prediction (intra prediction)" is indicated, "intra prediction" may be proposed as an example of "prediction". In other words, "prediction" in the present document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present document may be implemented individually or simultaneously.

Figure 2:
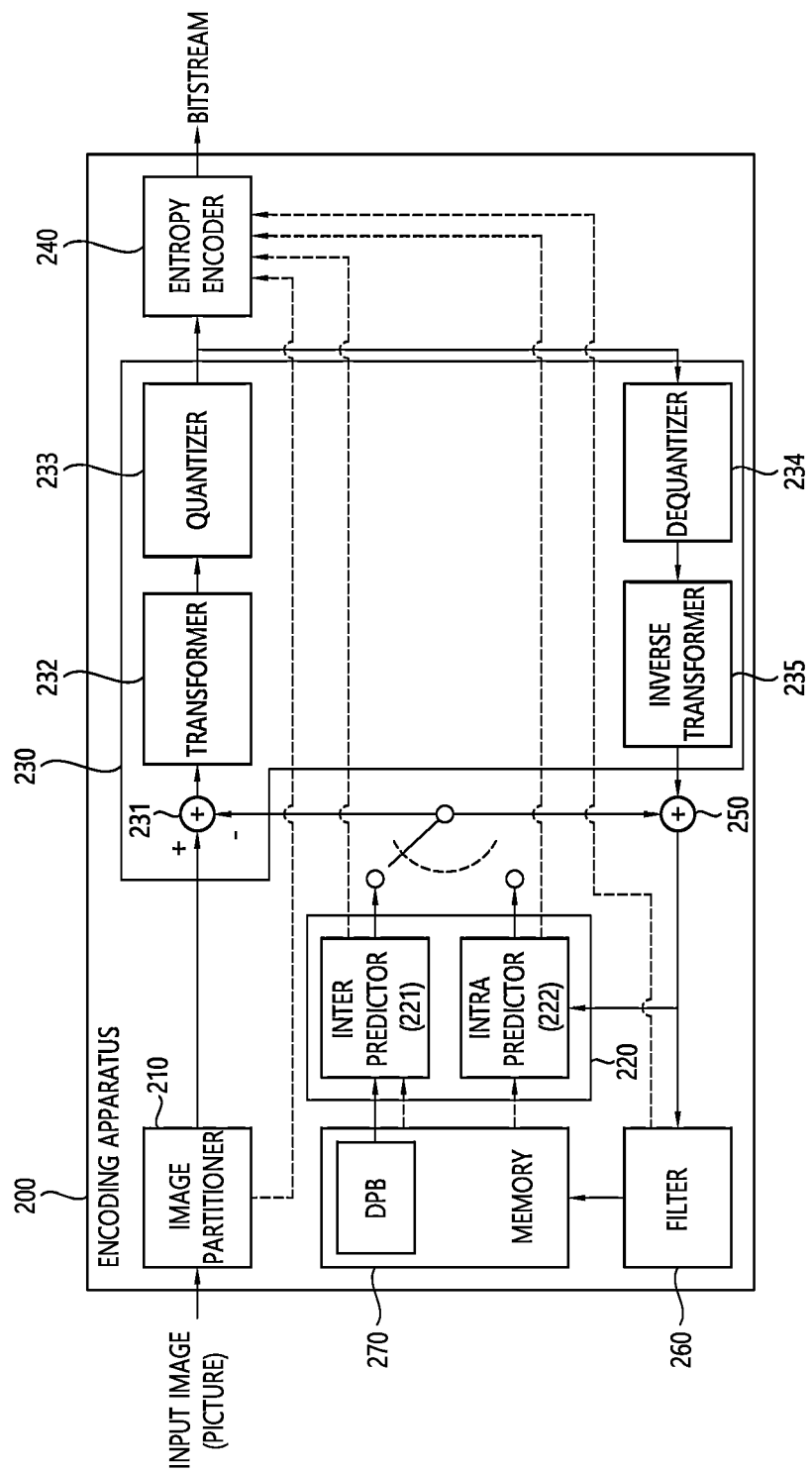
FIG. 2 is a diagram schematically illustrating a configuration of a video/image encoding apparatus to which the embodiments of the present document may be applied.

FIG. 2 is a diagram schematically illustrating a configuration of a video/image encoding apparatus to which the embodiments of the present document may be applied. Hereinafter, what is referred to as the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
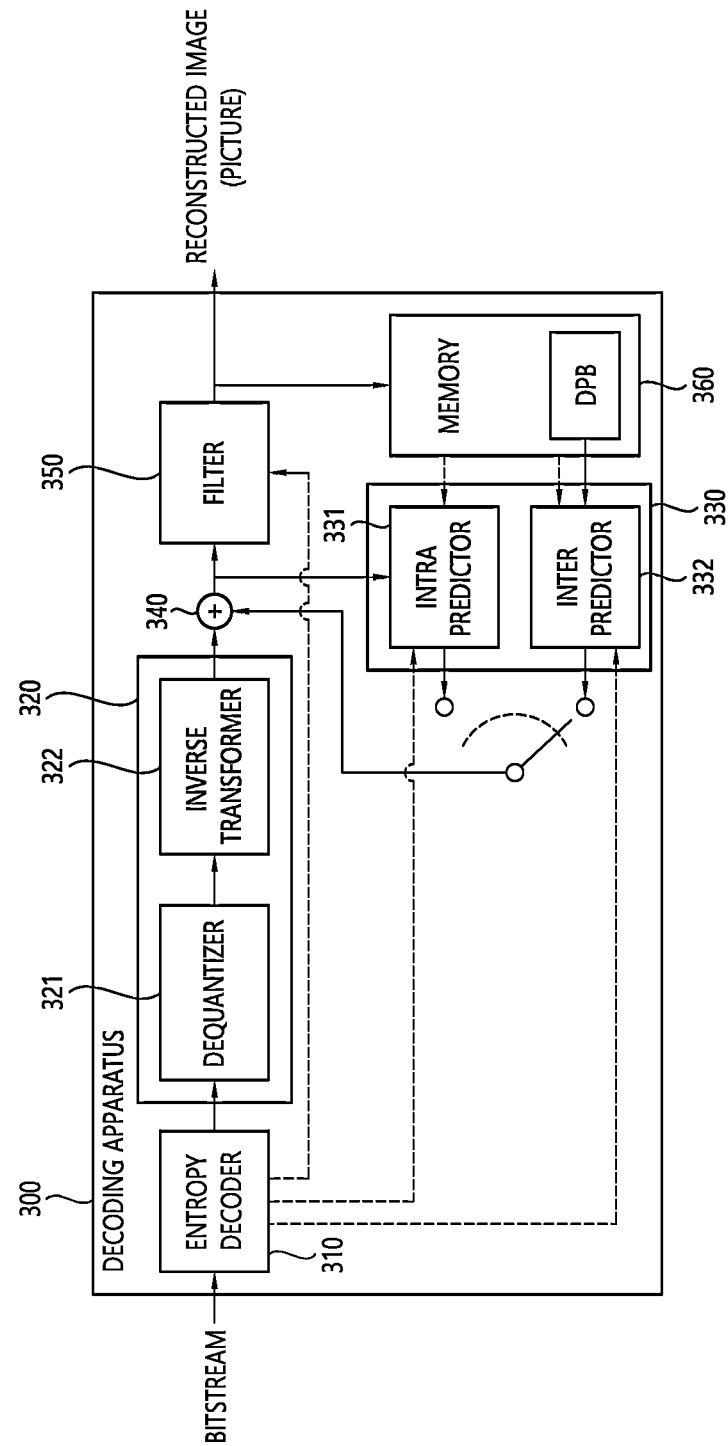
FIG. 3 is a diagram schematically illustrating a configuration of a video/image decoding apparatus to which the embodiments of the present document may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 33 1of the decoding apparatus 300. The same may also apply to the unit 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain) The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/ inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon. In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression. In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Intra prediction may refer to prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include samples adjacent to the left boundary of the current block having a size of nW×nH and a total of 2×nH samples neighboring the bottom-left, samples adjacent to the top boudary of the current block and a total of 2×nW samples neighboring the top-right, and one sample neighboring the top-left of the current block. Alternatively, the neighboring reference samples of the current block may include a plurality of upper neighboring samples and a plurality of left neighboring samples. In addition, the neighboring reference samples of the current block may include a total of nH samples adjacent to the right boundary of the current block having a size of nWxnH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to use for prediction by substituting the samples that are not available with the available samples. Alternatively, neighboring reference samples to be used for prediction may be configured through interpolation of the available samples.

When the neighboring reference samples are derived, (i) the prediction sample may be derived based on the average or interpolation of neighboring reference samples of the current block, and (ii) the prediction sample may be derived based on the reference sample present in a specific (prediction) direction for the prediction sample among the periphery reference samples of the current block. The case of (i) may be called non-directional mode or non-angular mode and the case of (ii) may be called directional mode or angular mode.

Furthermore, the prediction sample may also be generated through interpolation between the second neighboring sample and the first neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples using a linear model. This case may be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra sub-partitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Specifically, the intra prediction procedure may include an intra prediction mode/type determination step, a neighboring reference sample derivation step, and an intra prediction mode/type based prediction sample derivation step. In addition, a post-filtering step may be performed on the predicted sample derived as needed.

When intra prediction is applied, the intra prediction mode applied to the current block may be determined using the intra prediction mode of the neighboring block. For example, the decoding apparatus may select one of most probable mode (mpm) candidates of an mpm list derived based on the intra prediction mode of the neighboring block (ex. left and/or upper neighboring blocks) of the current block based on the received mpm index and select one of the other remaining intro prediction modes not included in the mpm candidates (and planar mode) based on the remaining intra prediction mode information. The mpm list may be configured to include or not include a planar mode as a candidate. For example, if the mpm list includes the planar mode as a candidate, the mpm list may have six candidates. If the mpm list does not include the planar mode as a candidate, the mpm list may have three candidates. When the mpm list does not include the planar mode as a candidate, a not planar flag (ex. intra_luma_not_planar_flag) indicating whether an intra prediction mode of the current block is not the planar mode may be signaled. For example, the mpm flag may be signaled first, and the mpm index and not planar flag may be signaled when the value of the mpm flag is 1. In addition, the mpm index may be signaled when the value of the not planar flag is 1. Here, the mpm list is configured not to include the planar mode as a candidate does not is to signal the not planar flag first to check whether it is the planar mode first because the planar mode is always considered as mpm.

For example, whether the intra prediction mode applied to the current block is in mpm candidates (and planar mode) or in remaining mode may be indicated based on the mpm flag (ex. Intra_luma_mpm_flag). A value 1 of the mpm flag may indicate that the intra prediction mode for the current block is within mpm candidates (and planar mode), and a value 0 of the mpm flag may indicate that the intra prediction mode for the current block is not in the mpm candidates (and planar mode). The value 0 of the not planar flag (ex. Intra_luma_not_planar_flag) may indicate that the intra prediction mode for the current block is planar mode, and the value 1 of the not planar flag value may indicate that the intra prediction mode for the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may index remaining intra prediction modes not included in the mpm candidates (and planar mode) among all intra prediction modes in order of prediction mode number to indicate one of them. The intra prediction mode may be an intra prediction mode for a luma component (sample). Hereinafter, intra prediction mode information may include at least one of the mpm flag (ex. Intra_luma_mpm_flag), the not planar flag (ex. Intra_luma_not_planar_flag), the mpm index (ex. mpm_idx or intra_luma_mpm_idx), and the remaining intra prediction mode information (rem_intra_luma_pred_mode or intra_luma_mpm_remainder). In the present document, the MPM list may be referred to in various terms such as MPM candidate list and candModeList. When MIP is applied to the current block, a separate mpm flag (ex. intra_mip_mpm_flag), an mpm index (ex. intra_mip_mpm_idx), and remaining intra prediction mode information (ex. intra_mip_mpm_remainder) for MIP may be signaled and the not planar flag is not signaled.

In other words, in general, when block splitting is performed on an image, a current block and a neighboring block to be coded have similar image characteristics. Therefore, the current block and the neighboring block have a high probability of having the same or similar intra prediction mode. Thus, the encoder may use the intra prediction mode of the neighboring block to encode the intra prediction mode of the current block.

For example, the encoder/decoder may configure a list of most probable modes (MPM) for the current block. The MPM list may also be referred to as an MPM candidate list. Herein, the MPM may refer to a mode used to improve coding efficiency in consideration of similarity between the current block and neighboring block in intra prediction mode coding. As described above, the MPM list may be configured to include the planar mode or may be configured to exclude the planar mode. For example, when the MPM list includes the planar mode, the number of candidates in the MPM list may be 6. And, if the MPM list does not include the planar mode, the number of candidates in the MPM list may be 5.

The encoder/decoder may configure an MPM list including 5 or 6 MPMs.

In order to configure the MPM list, three types of modes can be considered: default intra modes, neighbor intra modes, and the derived intra modes.

For the neighboring intra modes, two neighboring blocks, i.e., a left neighboring block and an upper neighboring block, may be considered.

As described above, if the MPM list is configured not to include the planar mode, the planar mode is excluded from the list, and the number of MPM list candidates may be set to 5.

In addition, the non-directional mode (or non-angular mode) among the intra prediction modes may include a DC mode based on the average of neighboring reference samples of the current block or a planar mode based on interpolation.

When inter prediction is applied, the predictor of the encoding apparatus/decoding apparatus may derive a prediction sample by performing inter prediction in units of blocks. Inter prediction may be a prediction derived in a manner that is dependent on data elements (ex. sample values or motion information) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Figure 4:
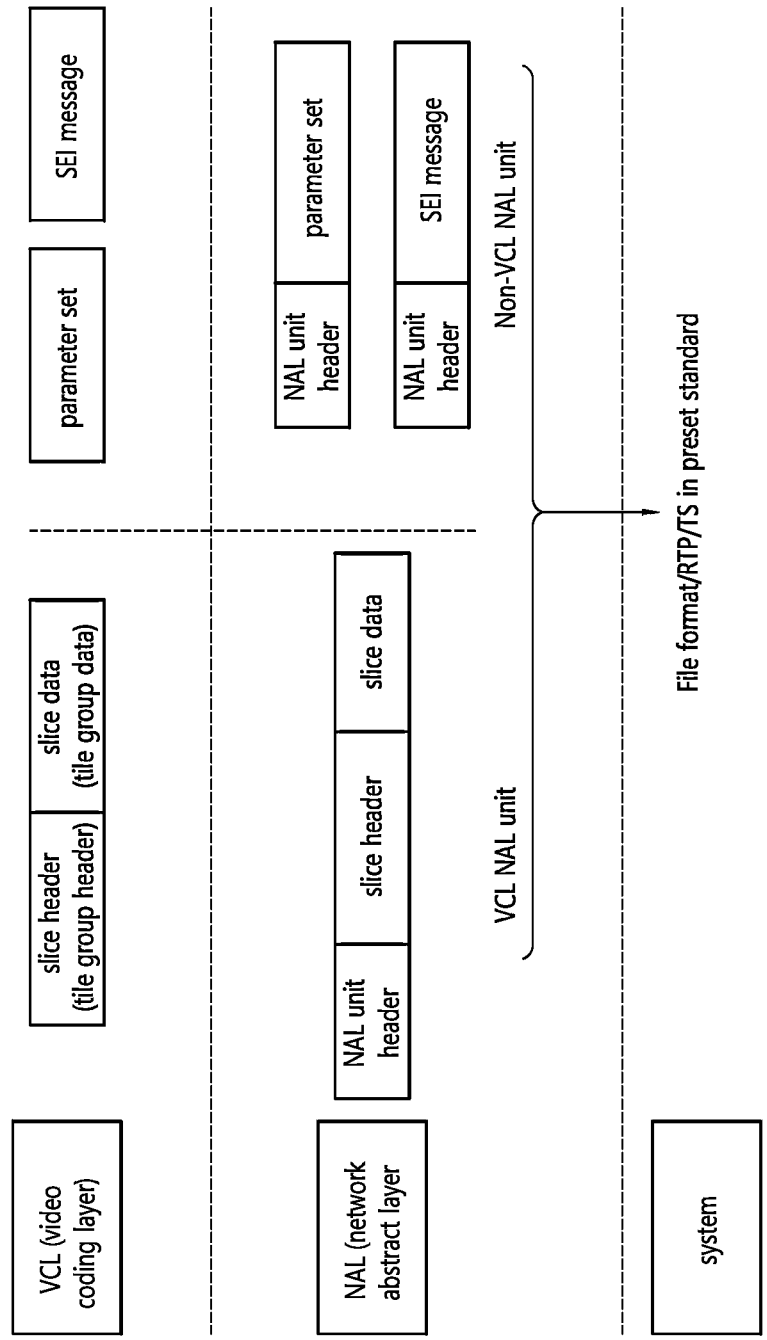
FIG. 4 exemplarily shows a hierarchical structure for a coded image/video.

FIG. 4 exemplarily shows a hierarchical structure for a coded image/video.

Referring to FIG. 4, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS(Video Parameter Set) NAL unit: Type for NAL unit including VPS

SPS(Sequence Parameter Set) NAL unit: Type for NAL unit including SPS

PPS(Picture Parameter Set) NAL unit: Type for NAL unit including PPS

PH(Picture header) NAL unit: Type for NAL unit including PH

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In the present document, a slice or a picture may be mixed or replaced with a tile group. Also, in the present document, a slice header or a picture header may be mixed or replaced with a tile group header.

The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high level syntax (HLS) in the present document may include at least one of the APS syntax, the PPS syntax, the SPS syntax, the VPS syntax, the DPS syntax, and the slice header syntax.

In the present document, the image/image information encoded from the encoding apparatus and signaled to the decoding apparatus in the form of a bitstream includes not only partitioning related information in a picture, intra/inter prediction information, residual information, in-loop filtering information, etc, but also information included in a slice header, information included in the APS, information included in the PPS, information included in an SPS, and/or information included in the VPS.

Meanwhile, in order to compensate for a difference between an original image and a reconstructed image due to an error occurring in a compression coding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Figure 5:
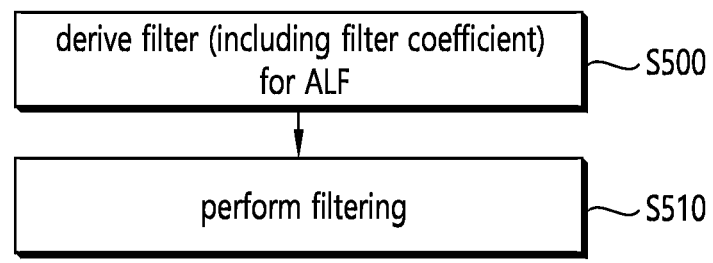
FIG. 5 is a flowchart schematically illustrating an example of an ALF process.

FIG. 5 is a flowchart schematically illustrating an example of an ALF process. The ALF process disclosed in FIG. 5 may be performed in an encoding apparatus and a decoding apparatus. In this document, the coding apparatus may include the encoding apparatus and/or the decoding apparatus.

Referring to FIG. 5, the coding apparatus derives a filter for ALF (S500). The filter may include filter coefficients. The coding apparatus may determine whether to apply the ALF, and when determining to apply the ALF, may derive a filter including filter coefficients for the ALF. Information for deriving a filter (coefficients) for ALF or a filter (coefficients) for ALF may be referred to as an ALF parameter. Information on whether ALF is applied (i.e., ALF enabled flag) and ALF data for deriving the filter may be signaled from the encoding apparatus to the decoding apparatus. ALF data may include information for deriving a filter for the ALF. Also, for example, for hierarchical control of ALF, an ALF enabled flag may be signaled at the SPS, picture header, slice header, and/or CTB level, respectively.

In order to derive the filter for the ALF, the activity and/or directivity of the current block (or ALF target block) is derived, and the filter may be derived based on the activity and/or the directionality. For example, the ALF process may be applied in units of 4×4 blocks (based on luma components). The current block or the ALF target block may be, for example, a CU, or may be a 4×4 block within a CU. Specifically, for example, filters for ALF may be derived based on first filters derived from information included in the ALF data and predefined second filters, and the coding apparatus may select one of the filters based on the activity and/or the directionality. The coding apparatus may use filter coefficients included in the selected filter for the ALF.

The coding apparatus performs filtering based on the filter (S510). Modified reconstructed samples may be derived based on the filtering. For example, the filter coefficients in the filter may be arranged or allocated according to a filter shape, and the filtering may be performed on reconstructed samples in the current block. Here, the reconstructed samples in the current block may be reconstructed samples after the deblocking filter process and the SAO process are completed. For example, one filter shape may be used, or one filter shape may be selected and used from among a plurality of predetermined filter shapes. For example, a filter shape applied to the luma component and a filter shape applied to the chroma component may be different. For example, a 7×7 diamond filter shape may be used for the luma component, and a 5×5 diamond filter shape may be used for the chroma component.

Figure 6:
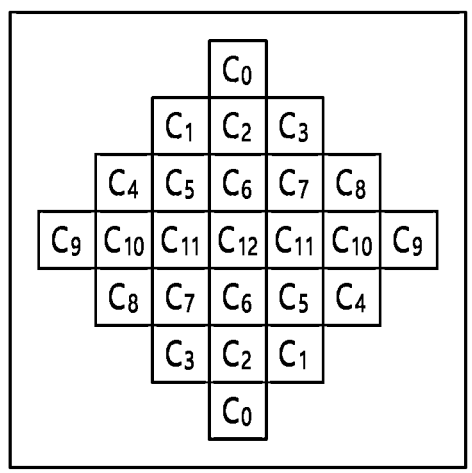
FIG. 6 shows examples of the shapes of an ALF filters.
Figure 6:
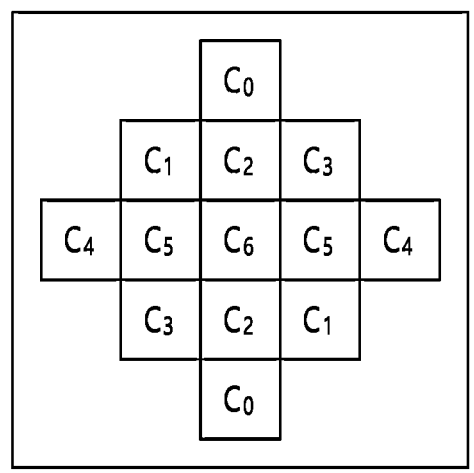

FIG. 6 shows examples of the shape of an ALF filter.

The (a) of FIG. 6 shows the shape of a 7×7 diamond filter, and the (b) of FIG. 6 shows the shape of a 5×5 diamond filter. In FIG. 6, Cn in the filter shape represents a filter coefficient. When n in Cn is the same, this indicates that the same filter coefficients can be assigned. In the present document, a position and/or unit to which filter coefficients are assigned according to the filter shape of the ALF may be referred to as a filter tab. In this case, one filter coefficient may be assigned to each filter tap, and the arrangement of the filter taps may correspond to a filter shape. A filter tab located at the center of the filter shape may be referred to as a center filter tab. The same filter coefficients may be assigned to two filter taps of the same n value that exist at positions corresponding to each other with respect to the center filter tap. For example, in the case of a 7×7 diamond filter shape, 25 filter taps are included, and since filter coefficients C0 to C11 are assigned in a centrally symmetric form, filter coefficients may be assigned to the 25 filter taps using only 13 filter coefficients. Also, for example, in the case of a 5×5 diamond filter shape, 13 filter taps are included, and since filter coefficients C0 to C5 are assigned in a centrally symmetrical form, filter coefficients may be assigned to the 13 filter taps using only 7 filter coefficients. For example, in order to reduce the data amount of signaled information on filter coefficients, 12 filter coefficients among 13 filter coefficients for the 7×7 diamond filter shape may be signaled (explicitly), and one filter coefficient may be derived (implicitly). Also, for example, 6 filter coefficients among 7 filter coefficients for a 5×5 diamond filter shape may be signaled (explicitly) and one filter coefficient may be derived (implicitly).

According to an embodiment of the present document, the ALF parameter used for the ALF process may be signaled through an adaptation parameter set (APS). The ALF parameter may be derived from filter information for the ALF or ALF data.

The ALF is a type of in-loop filtering technique that can be applied in video/image coding as described above. The ALF may be performed using a Wiener-based adaptive filter. This may be to minimize a mean square error (MSE) between original samples and decoded samples (or reconstructed samples). A high level design for an ALF tool may incorporate syntax elements accessible from the SPS and/or slice header (or tile group header).

Figure 7:
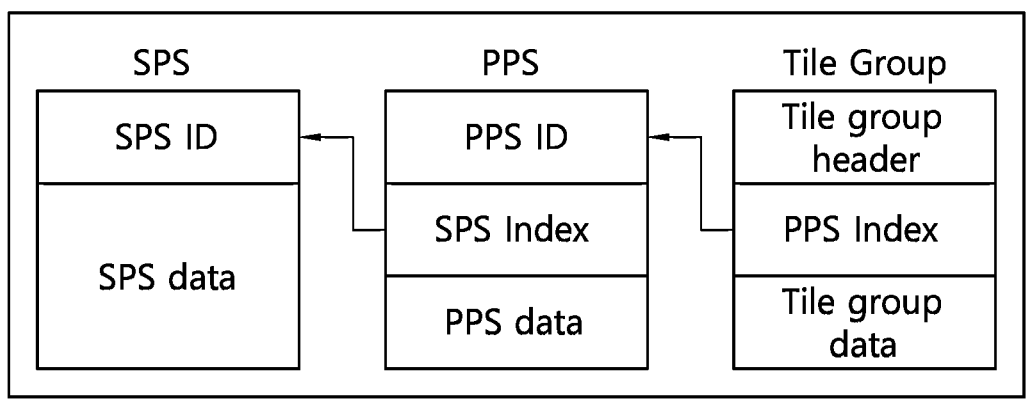
FIG. 7 shows an example of a hierarchical structure of ALF data.

FIG. 7 shows an example of a hierarchical structure of ALF data.

Referring to FIG. 7, a coded video sequence (CVS) may include an SPS, one or more PPSs, and one or more coded pictures that follow. Each coded picture may be divided into rectangular regions. The rectangular regions may be referred to as tiles. One or more tiles may be aggregated to form a tile group or slice. In this case, the tile group header may be linked to the PPS, and the PPS may be linked to the SPS. According to the existing method, the ALF data (ALF parameter) is included in the tile group header. Considering that one video consists of a plurality of pictures and one picture includes a plurality of tiles, the frequent ALF data (ALF parameter) signaling in units of tile groups reduces coding efficiency.

According to an embodiment proposed in the present document, the ALF parameter may be included in the APS and signaled as follows.

Figure 8:
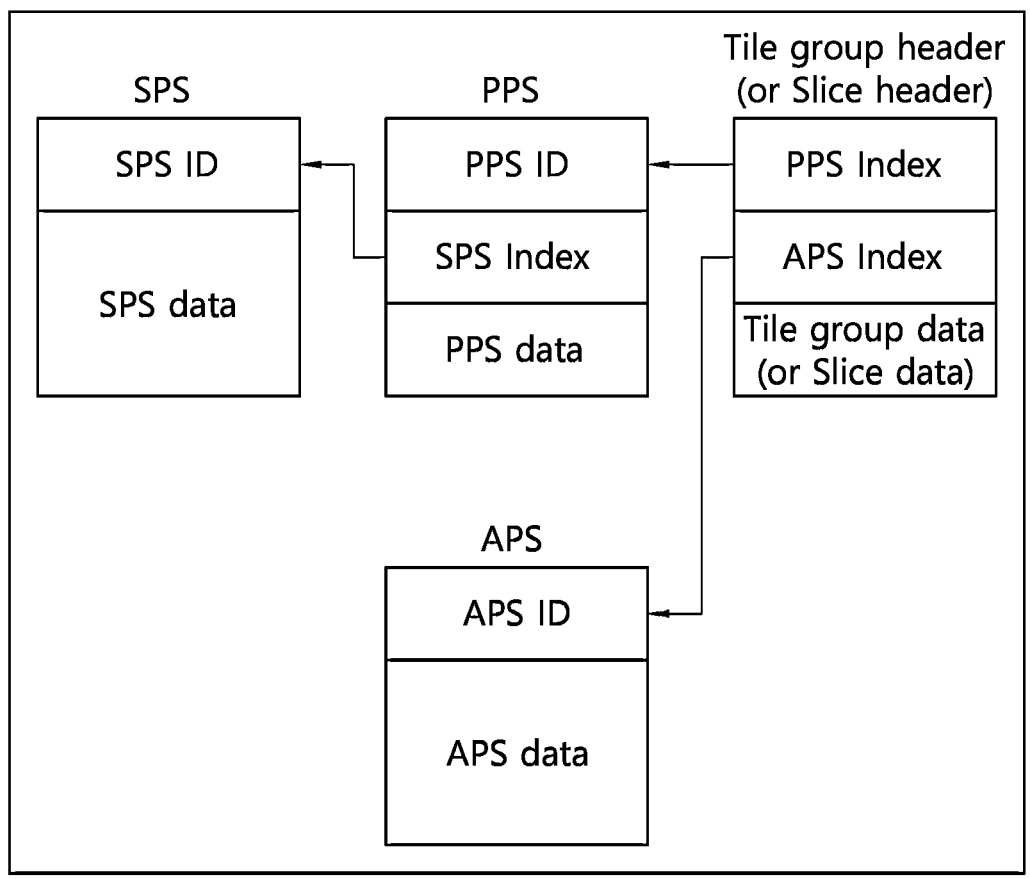
FIG. 8 shows another example of a hierarchical structure of ALF data.

FIG. 8 shows another example of a hierarchical structure of ALF data.

Referring to FIG. 8, an APS is defined, and the APS may carry necessary ALF data (ALF parameters). In addition, the APS may have self-identification parameters and ALF data. The self-identification parameter of the APS may include an APS ID. That is, the APS may include information indicating the APS ID in addition to the ALF data field. The tile group header or the slice header may refer to the APS using APS index information. In other words, the tile group header or the slice header may include APS index information, and the ALF process for the target block may be performed based on the ALF data (ALF parameter) included in the APS having the APS ID indicated by the APS index information. Here, the APS index information may be referred to as APS ID information.

In addition, the SPS may include a flag allowing the use of the ALF. For example, when CVS begins, an SPS may be checked, and the flag may be checked in the SPS. For example, the SPS may include the syntax of Table 1 below. The syntax of Table 1 may be a part of the SPS.

TABLE 1

|  | Descriptor |
| --- | --- |
| seq_parameter_set_rbsp( ) { | |
| ... | |
| sps_alf_enabled_flag | u(1) |
| } | |

The semantics of syntax elements included in the syntax of Table 1 may be expressed, for example, as shown in the following table.

TABLE 2 sps_alf_enabled_flag equal to 0 specifies that the adaptive loop filter is disabled.
sps_alf_enabled_flag equal to 1 specifies that the adaptive loop filter is enabled.

That is, the syntax element sps_alf_enabled_flag may indicate whether ALF is enabled based on whether the value is 0 or 1. The syntax element sps_alf enabled_flag may be referred to as an ALF enabled flag (which may be referred to as a first ALF enabled flag) and may be included in the SPS. That is, the ALF enabled flag may be signaled in SPS (or SPS level). When the value of the ALF enabled flag signaled by the SPS is 1, it may be determined that the ALF is basically enabled for pictures in the CVS referring to the SPS. Meanwhile, as described above, the ALF may be individually turned on/off by signaling an additional enabled flag at a lower level than the SPS.

For example, if the ALF tool is enabled for CVS, an additional enabled flag (which may be called a second ALF enabled flag) may be signaled in a tile group header or a slice header. The second ALF enabled flag may be parsed/signaled, for example, when ALF is enabled at the SPS level. If the value of the second ALF enabled flag is 1, ALF data may be parsed through the tile group header or the slice header. For example, the second ALF enabled flag may specify an ALF enabling condition for luma and chroma components. The ALF data can be accessed through APS ID information.

TABLE 3

| | Descriptor |
|---|---|
| tile_group_header ( ) { | |
|   tile_group_pic_parameter_set_id | ue(v) |
|   if( sps_alf_enabled_flag ) { | |
|     tile_group_alf_enabled_flag | u(1) |
|     if( tile_group_alf_enabled_flag ) | |
|       tile_group_aps_id | u(5) |
| } | |

TABLE 4

| | Descriptor |
|---|---|
| slice_header ( ) { | |
|   slice_pic_parameter_set_id | ue(v) |
|   if( sps_alf_enabled_flag ) { | |
|     slice_alf_enabled_flag | u(1) |
|     if( tile_group_alf_enabled_flag ) | |
|       slice_aps_id | u(5) |
| } | |

Semantics of syntax elements included in the syntax of Table 3 or Table 4 may be expressed, for example, as shown in the following tables.

TABLE 5 tile_group_alf_enabled_flag equal to 1 specifies that adaptive loop filter is enabled and may be applied to Y, Cb, or Cr color component in a tile group. tile_group_alf_enabled_flag equal to 0 specifies that adaptive loop filter is disabled for all color components in a tile group.
tile_group_aps_id specifies the adaptation_parameter_set_id of the APS that the tile group refers to. The TemporalId of the APS NAL unit having adaptation_parameter_set_id equal to tile_group_aps_id shall be less than or equal to the TemporalId of the coded tile group NAL unit.
When multiple APSs with the same value of adaptation_parameter_set_id are referred to by two or more tile groups of the same picture, the multiple APSs with the same value of adaptation_parameter_set_id shall have the same content.

TABLE 6 slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to ph_alf_enabled_flag.
slice_aps_id specifies the adaptation_parameter_set_id of the APS that the slice refers to. The TemporalId of the APS NAL unit having adaptation_parameter_set_id equal to tile_group_aps_id shall be less than or equal to the TemporalId of the coded slice NAL unit.
When multiple APSs with the same value of adaptation_parameter_set_id are referred to by two or more slices of the same picture, the multiple APSs with the same value of adaptation_parameter_set_id shall have the same content.

The second ALF enabled flag may include the syntax element tile_group_alf_enabled_flag or the syntax element slice_alf_enabled_flag.

An APS referenced by a corresponding tile group or a corresponding slice may be identified based on the APS ID information (i.e., the syntax element tile_group_aps_jd or the syntax element slice_aps_jd). The APS may include ALF data.

Meanwhile, the structure of the APS including the ALF data may be described based on the following syntax and semantics, for example. The syntax of Table 7 may be a part of the APS.

TABLE 7

| | Descriptor |
|---|---|
| adaptation_parameter_set_rbsp( ) { | |
|   adaptation_parameter_set_id | u(5) |
|   alf_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

TABLE 8 adaptation_parameter_set_id provides an identifier for the APS for reference by other syntax elements.
aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.
aps_extension_data_flag may have any value. Its presence and value do not affect decoder conformance to profiles specified in this version of this Specification. Decoders conforming to this version of this Specification shall ignore all aps_extension data flag syntax elements.
NOTE
APSs can be shared across pictures and can be different in different tile groups within a picture.

As described above, the syntax element adaptation_parameter_set_id may indicate the identifier of the corresponding APS. That is, the APS may be identified based on the syntax element adaptation_parameter_set_id. The syntax element adaptation_parameter_set_id may be referred to as APS ID information. Also, the APS may include an ALF data field. The ALF data field may be parsed/signaled after the syntax element adaptation_parameter_set_id.

Also, for example, an APS extension flag (i.e., syntax element aps_extension_flag) may be parsed/signaled in the APS. The APS extension flag may indicate whether APS extension data flag (aps_extension_data_flag) syntax elements are present. The APS extension flag may be used, for example, to provide extension points for a later version of the VVC standard.

Core processing/handling of ALF information may be performed in a slice header or a tile group header. The above described ALF data field may include information on processing of the ALF filter. For example, information that can be extracted from the ALF data field includes information on the number of filters used, information indicating whether the ALF is applied only to a luma component, information on a color component, information on an exponential golomb (EG) parameters and/or delta values of filter coefficients, etc.

Meanwhile, the ALF data field may include, for example, ALF data syntax as follows.

TABLE 9

| | Descriptor |
|---|---|
| alf_data( ) { | |
|   alf_chroma_idc | tu(v) |
|   alf_luma_num_filters_signalled_minus1 | tb(v) |
|   if( alf_luma_num_filters_signalled_minus1 > 0 ) { | |
|     for( filtIdx = 0; filtIdx < NumAlfFilters; filtIdx++ ) | |
|       alf_luma_coeff_delta_idx[ filtIdx ] | tb(v) |
|   } | |
|   alf_luma_coeff_delta_flag | u(1) |
|   if ( !alf_luma_coeff_delta_flag && | |

TABLE 9-continued

| | Descriptor |
|---|---|
| alf_luma_num_filters_signalled_minus1 > 0 ) | |
|     alf_luma_coeff_delta_prediction_flag | u(1) |
|   alf_luma_min_eg_order_minus1 | ue(v) |
|   for( i = 0; i < 3; i++ ) | |
|     alf_luma_eg_order_increase_flag[ i ] | u(1) |
|   if ( alf_luma_coeff_delta_flag ) { | |
|     for( sigFiltIdx = 0; sigFiltIdx <= alf_luma_num_filters_signalled_minus1; sigFiltIdx++ ) | |
|       alf_luma_coeff_flag[ sigFiltIdx ] | u(1) |
|   } | |
|   for( sigFiltIdx = 0; sigFiltIdx <= alf_luma_num_filters_signalled_minus1; sigFiltIdx++ ) { | |
|     if ( alf_luma_coeff_flag[ sigFiltIdx ] ) { | |
|       for ( j = 0; j < 12; j++ ) { | |
|         alf_luma_coeff_delta_abs[ sigFiltIdx ][ j ] | uek(v) |
|         if( alf_luma_coeff_delta_abs[ sigFiltIdx ][ j ] ) | |
|           alf_luma_coeff_delta_sign[ sigFiltIdx ][ j ] | u(1) |
|     } | |
|   } | |
| } | |
| if ( alf_chroma_idc > 0 ) { | |
|   alf_chroma_min_eg_order_minus1 | ue(v) |
|   for( i = 0; i < 2; i++ ) | |
|     alf_chroma_eg_order_increase_flag[ i ] | u(1) |
|   for ( j = 0; j < 6; j++ ) { | |
|     alf_chroma_coeff_abs[ j ] | uek(v) |
|     if( alf_chroma_coeff_abs[ j ] > 0 ) | |
|       alf_chroma_coeff_sign[ j ] | u(1) |
|   } | |
| } | |

Semantics of syntax elements included in the syntax of Table 9 may be expressed, for example, as shown in the following table.

TABLE 10 alf_chroma_idc equal to 0 specifies that the adaptive loop filter is not applied to Cb and Cr colour components. alf_chroma_idc equal to 1 indicates that the adaptive loop filter is applied to the Cb colour component. alf_chroma_idc equal to 2 indicates that the adaptive loop filter is applied to the Cr colour component. alf_chroma_idc equal to 3 indicates that the adaptive loop filter is applied to Cb and Cr colour components.
The maximum value maxVal of the truncated unary binarization tu(v) is set equal to 3.
The variable NumAlfFilters specifying the number of different adaptive loop filters is set equal to 25.
alf_luma_num_filters_signalled_minus1 plus 1 specifies the number of adpative loop filter classes for which luma coefficients can be signalled. The value of alf_luma_num_filters_signalled_minus1 shall be in the range of 0 to NumAlfFilters − 1, inclusive.
The maximum value maxVal of the truncated binary binarization tb(v) is set equal to NumAlfFilters − 1.
alf_luma_coeff_delta_idx[ filtIdx ] specifies the indices of the signalled adaptive loop filter luma coefficient deltas for the filter class indicated by filtIdx ranging from 0 to NumAlfFilters − 1. When alf_luma_coeff_delta_idx[ filtIdx ] is not present, it is inferred to be equal to 0
The maximum value maxVal of the truncated binary binarization tb(v) is set equal to alf_luma_num_filters_signalled_minus1.
alf_luma_coeff_delta_flag equal to 1 indicates that alf_luma_coeff_delta_prediction_flag is not signalled. alf_luma_coeff_delta_flag equal to 0 indicates that alf_luma_coeff_delta_prediction_flag may be signalled.
alf_luma_coeff_delta_prediction_flag equal to 1 specifies that the signalled luma filter coefficient deltas are predicted from the deltas of the previous luma coefficients.
alf_luma_coeff_delta_prediction_flag equal to 0 specifies that the signalled luma filter coefficient deltas are not predicted from the deltas of the previous luma coefficients. When not present, alf_luma_coeff_delta_prediction_flag is inferred to be equal to 0.
alf_luma_min_eg_order_minus1 plus 1 specifies the minimum order of the exp-Golomb code for luma filter coefficient signalling. The value of alf_luma_min_eg_order_minus1 shall be in the range of 0 to 6, inclusive.
alf_luma_eg_order_increase_flag[ i ] equal to 1 specifies that the minimum order of the exp-Golomb code for luma filter coefficient signalling is incremented by 1.
alf_luma_eg_order_increase_flag[ i ] equal to 0 specifies that the minimum order of the exp-Golomb code for luma filter coefficient signalling is not incremented by 1.
The order expGoOrderY[ i ] of the exp-Golomb code used to decode the values of alf_luma_coeff_delta_abs[ sigFiltIdx ][ j ] is derived as follows:
expGoOrderY[ i ] = alf_luma_min_eg_order_minus1 + 1+ alf_luma_eg_order_increase_flag[ i ]    (7-51)
alf_luma_coeff_flag[ sigFiltIdx ] equal 1 specifies that the coefficients of the luma filter indicated by sigFiltIdx are signalled. alf_luma_coeff_flag[ sigFiltIdx ] equal to 0 specifies that all filter coefficients of the luma filter indicated by sigFiltIdx are set equal to 0. When not present, alf_luma_coeff_flag[ sigFiltIdx ] is set equal to 1.
alf_luma_coeff_delta_abs[ sigFiltIdx ][ j ] specifies the absolute value of the j-th coefficient delta of the signalled luma filter indicated by sigFiltIdx. When alf_luma_coeff_delta_abs[ sigFiltIdx ][ j ] is not present, it is inferred to be equal 0.
The order k of the exp-Golomb binarization uek(v) is derived as follows:
golombOrderIdxY[ ] = { 0, 0, 1, 0, 0, 1, 2, 1, 0, 0, 1, 2 }    (7-52)
k = expGoOrderY[ golombOrderIdxY[ j ] ]    (7-53)
alf_luma_coeff_delta_sign[ sigFiltIdx ][ j ] specifies the sign of the j-th luma coefficient of the filter indicated by sigFiltIdx as follows:
– If alf_luma_coeff_delta_sign[ sigFiltIdx ][ j ] is equal to 0, the corresponding luma filter coefficient has a positive value.
– Otherwise (alf_luma_coeff_delta_sign[ sigFiltIdx ][ j ] is equal to 1), the corresponding luma filter coefficient has a negative value.
When alf_luma_coeff_delta_sign[ sigFiltIdx ][ j ] is not present, it is inferred to be equal to 0.
The variable filterCoefficients[ sigFiltIdx ][ j ] with TABLE 10-continued sigFiltIdx = 0..alf_luma_num_filters_signalled_minus1, j = 0..11 is initialized as follows:
    filterCoefficients[ sigFiltIdx ][ j ] = alf_luma_coeff_delta_abs[ sigFiltIdx ][ j ] *       (7-54)
                ( 1 – 2 * alf_luma_coeff_delta_sign[ sigFiltIdx ][ j ] )
When alf_luma_coeff_delta_prediction_flag is equal 1, filterCoefficients[ sigFiltIdx ][ j ] with
sigFiltIdx = 1..alf_luma_num_filters_signalled_minus1 and j = 0..11 are modified as follows:
filterCoefficients[ sigFiltIdx ][ j ] += filterCoefficients[ sigFiltIdx – 1 ][ j ]              (7-55)
The  luma  filter  coefficients  AlfCoeff$_L$  with  elements  AlfCoeff$_L$[ filtIdx ][ j ],  with
filtIdx = 0..NumAlfFilters – 1 and j = 0..11 are derived as follows
AlfCoeff$_L$[ filtIdx ][ j ] = filterCoefficients[ alf_luma_coeff_delta_idx[ filtIdx ] ][ j ]
        (7-56)
The  last  filter  coefficients  AlfCoeff$_L$[ filtIdx ][ 12 ]  for  filtIdx = 0..NumAlfFilters – 1  are
derived as follows:
AlfCoeff$_L$[ filtIdx ][ 12 ] = 128 – $\Sigma_k$ ( AlfCoeff$_L$[ filtIdx ][ k ] << 1 ), with k = 0..11
It is a requirement of bitstream conformance that the values of AlfCoeff$_L$[ filtIdx ][ j ] with
filtIdx = 0..NumAlfFilters – 1, j = 0..11 shall be in the range of $-2^7$ to $2^7 - 1$, inclusive and that
the values of AlfCoeff$_L$[ filtIdx ][ 12 ] shall be in the range of 0 to $2^8 - 1$, inclusive.
alf_chroma_min_eg_order_minus1 plus 1 specifies the minimum order of the exp-Golomb
code for chroma filter coefficient signalling. The value of alf_chroma_min_eg_order_minus1
shall be in the range of 0 to 6, inclusive.
alf_chroma_eg_order_increase_flag[ i ] equal to 1 specifies that the minimum order of the
exp-Golomb  code  for  chroma  filter  coefficient  signalling  is  incremented  by  1.
alf_chroma_eg_order_increase_flag[ i ] equal to 0 specifies that the minimum order of the exp-
Golomb code for chroma filter coefficient signalling is not incremented by 1
The  order  expGoOrderC[ i ]  of  the  exp-Golomb  code  used  to  decode  the  values  of
alf_chroma_coeff_abs[ j ] is derived as follows:
expGoOrderC[ i ] = alf_chroma_min_eg_order_minus1 + 1+ alf_chroma_eg_order_increase_f
lag[ i ]
alf_chroma_coeff_abs[ j ] specifies the absolute value of the j-th chroma filter coefficient.
When alf_chroma_coeff_abs[ j ] is not present, it is inferred to be equal 0. It is a requirement of
bitstream conformance that the values of alf_chroma_coeff_abs[ j ] shall be in the range of 0 to
$2^7 - 1$, inclusive.
The order k of the exp-Golomb binarization uek(v) is derived as follows:
golombOrderIdxC[ ] = { 0, 0, 1, 0, 0, 1 }                                                      (7-59)
k = expGoOrderC[ golombOrderIdxC[ j ] ]                                                        (7-60)
alf_chroma_coeff_sign[ j ] specifies the sign of the j-th chroma filter coefficient as follows:
– If alf_chroma_coeff_sign[ j ] is equal to 0, the corresponding chroma filter coefficient has a
    positive value.
– Otherwise (alf_chroma_coeff_sign[ j ] is equal to 1), the corresponding chroma filter
    coefficient has a negative value.
When alf_chroma_coeff_sign[ j ] is not present, it is inferred to be equal to 0.
The chroma filter coefficients AlfCoeff$_C$ with elements c$_C$[ j ], with j = 0..5 are derived as
follows:
    AlfCoeff$_C$[ j ] = alf_chroma_coeff_abs[ j ] * ( 1 – 2 * alf_chroma_coeff_sign[ j ] )        (7-61)
The last filter coefficient for j = 6 is derived as follows:
    AlfCoeff$_C$[ 6 ] = 128 – $\Sigma_k$ ( AlfCoeff$_C$[ k ] << 1 ), with k = 0..5                 (7-62)
It is a requirement of bitstream conformance that the values of AlfCoeff$_C$[ j ] with j = 0..5 shall
be in the range of $-2^7 - 1$ to $2^7 - 1$, inclusive and that the values of AlfCoeff$_C$[ 6 ] shall be in the
range of 0 to $2^8 - 1$, inclusive.

For example, parsing of ALF data through a tile group header or a slice header may start by first parsing/signaling an alf_chroma_idc syntax element. The alf_chroma_idc syntax element may have values ranging from 0 to 3. The values may indicate whether the ALF based filtering process is applied only to the luma component, or to a combination of luma and chroma components. Once availability (enabling parameters) for each component is determined, information on the number of luma (component) filters may be parsed. As an example, the maximum number of filters that can be used may be set to 25. If the number of signaled luma filters is at least one, for each filter in the range from 0 to the maximum number of filters (i.e., 25, which may alternatively be known as class), index information for the filter may be parsed/signaled. This may imply that every class (i.e., from 0 to the maximum number of filters) is associated with a filter index. When a filter to be used for each class is labeled based on the filter index, a flag (i.e., alf_luma_coeff_delta_flag) may be parsed/signaled. The flag may be used to interpret whether flag information (i.e., alf_luma_coeff_delta_prediction_flag) related to prediction of an ALF luma filter coefficient delta value exists in a slice header or a tile group header.

If the number of luma filters signaled by the syntax element alf_luma_num_filters_signalled_minus1 is greater than 0 and the value of the syntax element alf_luma_coeff_delta_flag is 0, it means that the syntax element alf_luma_coeff_delta_prediction_flag is present in the slice header or tile group header and its status is evaluated. If the state of the syntax element alf_luma_coeff_delta_prediction_flag indicates 1, this may mean that luma filter coefficients are predicted from previous luma (filter) coefficients. If the state of the syntax element alf luma_coeff_delta_prediction_flag indicates 0, this may mean that luma filter coefficients are not predicted from deltas of previous luma (filter) coefficients.

When delta filter coefficients (i.e., alf_luma_coeff_delta_abs) are coded based on the exponential Golomb code, order k (order-k) of the exponential Golomb (EG) code may have to be determined in order to decode the delta luma filter coefficients (i.e., alf_luma_coeff_delta_abs). This information may be needed to decode the filter coefficients. The order of the exponential Golomb code may be expressed as EG(k). In order to determine the EG(k), the syntax element alf_luma_min_eg_order_minus1 may be parsed/signaled. The syntax element alf_luma_min_eg_order_minus 1 may be an entropy-coded syntax element. The syntax element alf_luma_min_eg_order_minus1 may indicate a smallest order of an EG used for decoding the delta luma filter coefficients. For example, the value of the syntax element alf_luma_min_eg_order_minus1 may be in the range of 0 to 6. After the syntax element alf_luma_min_eg_order_minus1 is parsed/signaled, the syntax element alf_luma_eg_order_increase_flag may be parsed/signaled. If the value of the syntax element alf_luma_eg_order_increase_flag is 1, this indicates that the order of the EG indicated by the syntax element alf_luma_min_eg_order_minus1 increases by 1. If the value of the syntax element alf_luma_eg_order_increase_flag is 0, this indicates that the order of the EG indicated by the syntax element alf_luma_min_eg_order_minus1 does not increase. The order of the EG may be represented by an index of the EG. The EG order (or EG index) (related to the luma component) based on the syntax element alf_luma_min_eg_order_minus1 and the syntax element alf_luma_eg_order_increase_flag may be determined, for example, as follows.

TABLE 11

1. The maximum golomb index is pre-defined according to the filter type. That is for a 5 × 5 filter the maximum golomb index is 2, and for a 7 × 7 the maximum golomb index is 3.
2. An initial constant, Kmin is set to be alf_luma_min_eg_order_minus1 + 1
3. For each index, i in the range of {0 to maximum golomb index} an intermediate array, i.e., KminTab[i] is computed, consisting of the sum of KminTab[i] = Kmin + alf_luma_eg_order_increase_flag[i]
4. Kmin is refreshed at the end of each iteration to be
    Kmin = KminTab[i]

Based on the determination process, expGoOrderY may be derived as expGoOrderY=KminTab. Through this, an array including EG orders can be derived, which can be used by the decoding apparatus. The expGoOrderY may indicate the EG order (or EG index).

There may be a pre-defined Golomb order index (i.e., golombOrderIdxY). The predefined Golomb order may be used to determine a final golomb order for coding the coefficients.

For example, the predefined Golomb order may be configured as, for example, the following.

golombOrderidxYr[ ]{0, 0, 1 0, 1 2, 1, 0, 0, 1, 2}

Here, the order k=expGoOrderY[golombOrderIdxY[j]], and j may represent the j-th signaled filter coefficient. For example, if j=2, that is, the third filter coefficient, golombordeddxY[2]=1, and thus k=expGoOrderY[1].

In this case, for example, if the value of the syntax element alf_luma_coeff_delta_flag represents true, that is, 1, the syntax element alf_luma_coeff_flag may be signaled for every filter that is signaled. The syntax element alf_luma_coeff_flag indicates whether a luma filter coefficient is (explicitly) signaled.

When the EG order and the states of the aforementioned related flags (i.e., alf_luma_coeff_delta_flag, alf_luma_coeff_flag, etc.) are determined, difference information and sign information of the luma filter coefficients may be parsed/signaled (i.e., alf_luma_coeff_flag is true), if indicated). Delta absolute value information (alf_luma_coeff_delata_abs syntax element) for each of the 12 filter coefficients may be parsed/signaled. In addition, if the syntax element alf_luma_coeff_delta_abs has a value, sign information (syntax element alf_luma_coeff_delta_sign) may be parsed/signaled. The information including the difference information and the sign information of the luma filter coefficients may be referred to as information about the luma filter coefficients.

The deltas of the filter coefficients may be determined along with the sign and stored. In this case, the deltas of the signed filter coefficients may be stored in the form of an array, which may be expressed as filterCoefficients. The deltas of the filter coefficients may be referred to as delta luma coefficients, and the deltas of the signed filter coefficients may be referred to as signed delta luma coefficients.

To determine the final filter coefficients from the signed delta luma coefficients, the (luma) filter coefficients may be updated as follows.

filterCoefficients[sigFiltIdx][j]+=filterCoefficients[sigFiltIdx][j]

Here, j may indicate a filter coefficient index, and sigFiltIdx may indicate a signaled filter index. j={0, . . . ,11} and sigFiltIdx={0, . . . , alf_luma_filters_signaled_minus 1}.

The coefficients may be copied into the final AlfCoeffL[filtIdx][j]. In this case, filtidx=0, . . . , 24 and j=0, . . . , 11.

The signed delta luma coefficients for a given filter index may be used to determine the first 12 filter coefficients. For example, the thirteenth filter coefficient of the 7×7 filter may be determined based on the following equation. The thirteenth filter coefficient may indicate the above-described center tap filter coefficient.

$$AlfCoeff_L[filtIdx][12]=128-_k AlfCoeff_L[filtIdx][k]$$  [Equation 1]

Here, the filter coefficient index 12 may indicate a thirteenth filter coefficient. For reference, since the filter coefficient index starts from 0, a value of 12 may indicate a thirteenth filter coefficient.

For example, in order to ensure bitstream conformance, the range of the values of the final filter coefficients AlfCoeffL[filtIdx][k] is 0, . . . , 11 may range from −27 to 27-1, and may range from 0 to 28-1 when k is 12. Here, k may be replaced with j.

When processing on the luma component is performed, processing on the chroma component may be performed based on the syntax element alf_chroma_idc. If the value of the syntax element alf_chroma_idc is greater than 0, the minimum EG order information for the chroma component (i.e., the syntax element alf_chroma_min_eg_order_minus1) may be parsed/signaled. According to the above-described embodiment of the present document, a 5×5 diamond filter shape may be used for the chroma component. In this case, the maximum golomb index may be 2. In this case, the EG order (or EG index) for the chroma component may be determined, for example, as follows.

TABLE 12

1. An initial constant, Kmin is set to be
    alf_chroma_min_eg_order_minus1 + 1
2. For each index, i in the range of {0 to maximum golomb index}, an intermediate array, i.e., KminTab[i] is computed, consisting of the sum of KminTab[i] = Kmin + alf_chroma_eg_order_increase_flag[i]
3. Kmin is refreshed at the end of each iteration to be
    Kmin = KminTab[i]

Based on the determination process, expGoOrderC may be derived as expGoOrderC=KminTab. Through this, an array including EG orders can be derived, which can be used by the decoding apparatus. The expGoOrderC may indicate the EG order (or EG index) for the chroma component.

There may be a pre-defined golomb order index (golombOrderIdxC). The pre-defined golomb order may be used to determine a final golomb order for coding the coefficients.

For example, the pre-defined golomb order may be configured as, for example, the following equation.

golombOrderIdxC[ ]={0, 0, 1, 0, 0, 1}

Here, the order k =expGoOrderC[golombOrderIdxC[j]], and j may represent the j-th signaled filter coefficient. For example, if j=2, it indicates the third filter coefficient, golomborderIdx Y[2]=1, and thus k=expGoOrderC[1].

Based on this, absolute value information and sign information of the chroma filter coefficients may be parsed/signaled. Information including absolute value information and sign information of the chroma filter coefficients may be referred to as information on the chroma filter coefficients. For example, a 5×5 diamond filter shape may be applied to the chroma component, and in this case, absolute delta information (the syntax element alf_chroma_coeff_abs) for each of the six (chroma component) filter coefficients may be parsed/signaled. In addition, if the value of the syntax element alf_chroma_coeff_abs is greater than 0, sign information (the syntax element alf_chroma_coeff_sign) may be parsed/signaled. For example, the six chroma filter coefficients may be derived based on information on the chroma filter coefficients. In this case, the seventh chroma filter coefficient may be determined based on the following equation, for example. The seventh filter coefficient may represent the above-described center tap filter coefficient.

$$\text{AlfCoeff}_C[6]=128-\Sigma_k\text{AlfCoeff}_C[\text{filtidx}][k] <<1 \quad \text{[Equation 2]}$$

Here, the filter coefficient index 6 may indicate a seventh filter coefficient. For reference, since the filter coefficient index starts from 0, a value of 6 may indicate a seventh filter coefficient.

For example, in order to ensure bitstream conformance, the range of the values of the final filter coefficients AlfCoeffC[filtIdx][k] may be from $-2^7$ to $2^7-1$ when k is 0, . . . , 5, and the range of the values of the final filter coefficients AlfCoeffC[filtIdx][k] may be from $-2^8$ to $2^8-1$ when k is 6. Here, k may be replaced with j.

When the (luma/chroma) filter coefficients are derived, ALF based filtering may be performed based on the filter coefficients or a filter including the filter coefficients. Through this, modified reconstructed samples may be derived, as described above. In addition, multiple filters may be derived, and filter coefficients of one of the multiple filters may be used for the ALF process. For example, one of the plurality of filters may be indicated based on the signaled filter selection information. Or, for example, one of the plurality of filters may be selected based on the activity and/or directionality of the current block or the ALF target block, and filter coefficients of the selected filter may be used for the ALF process.

Meanwhile, in order to increase coding efficiency, luma mapping with chroma scaling (LMCS) may be applied as described above. LMCS may be referred to as a loop reshaping. In order to increase coding efficiency, LMCS control and/or signaling of LMCS related information may be performed hierarchically.

Figure 9:
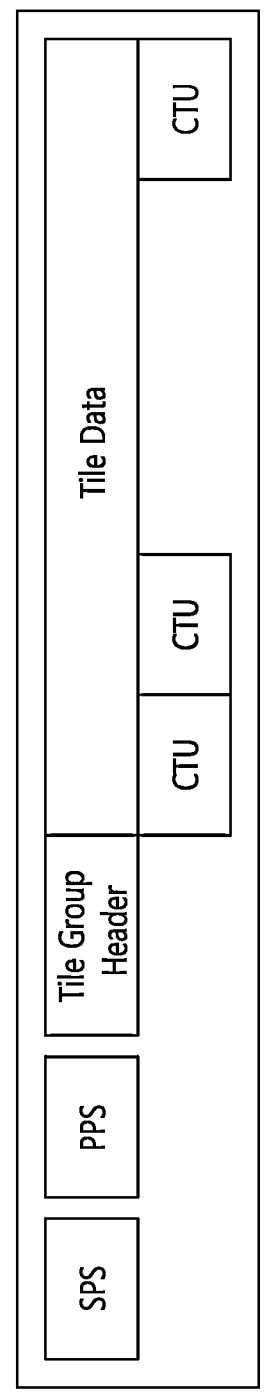
FIG. 9 exemplarily illustrates a hierarchical structure of a CVS according to an embodiment of the present document.

FIG. 9 exemplarily illustrates a hierarchical structure of a CVS according to an embodiment of the present document. A coded video sequence (CVS) may include a sequence parameter set (SPS), a picture parameter set (PPS), a tile group header, tile data, and/or CTU(s). Here, the tile group header and the tile data may be referred to as a slice header and slice data, respectively.

The SPS may include flags natively to enable tools to be used in CVS. In addition, the SPS may be referred to by the PPS including information on parameters that change for each picture. Each of the coded pictures may include one or more coded rectangular domain tiles. The tiles may be grouped into raster scans forming tile groups. Each tile group is encapsulated with header information called a tile group header. Each tile consists of a CTU comprising coded data. Here the data may include original sample values, prediction sample values, and its luma and chroma components (luma prediction sample values and chroma prediction sample values).

Figure 10:
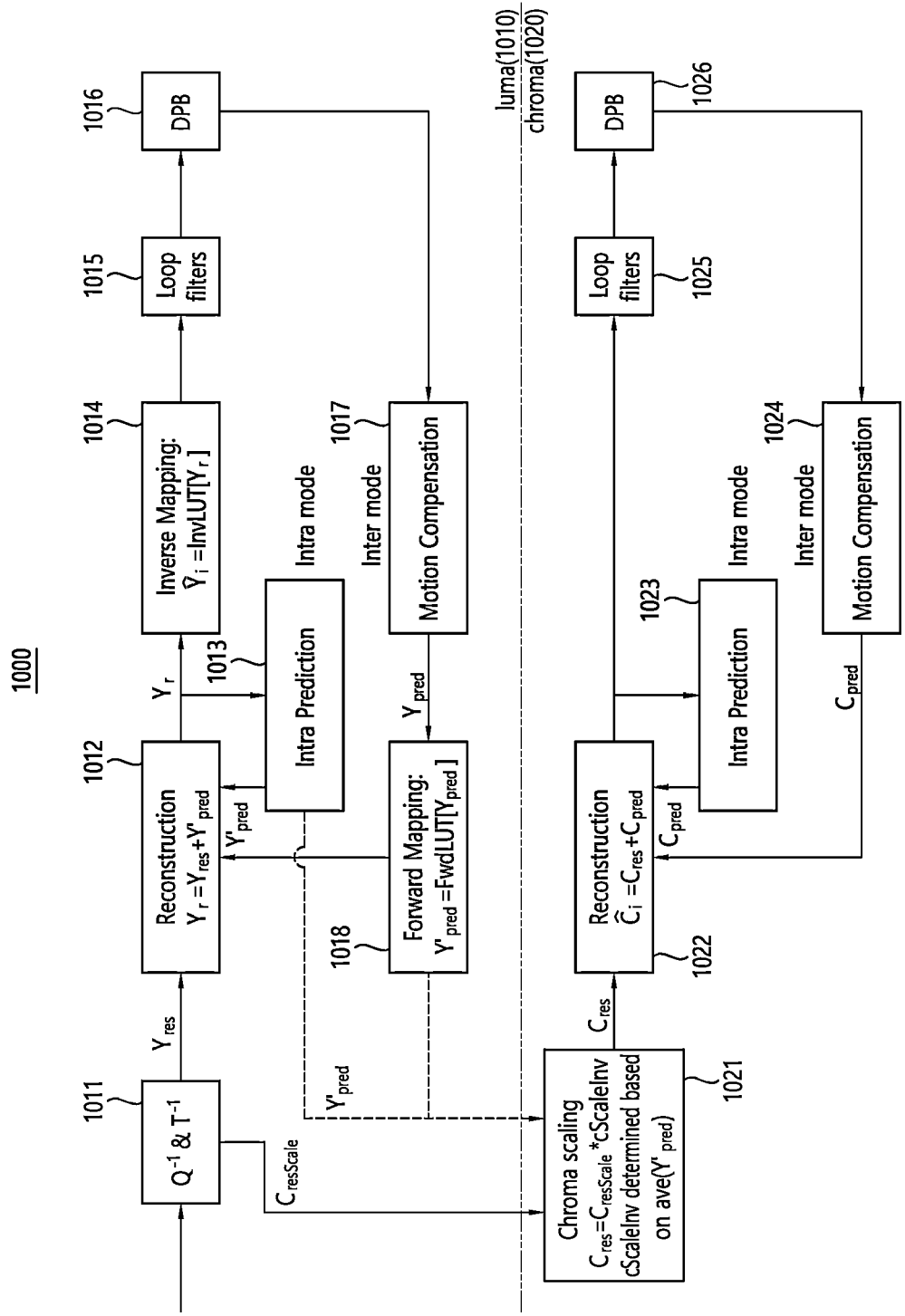
FIG. 10 illustrates an exemplary LMCS structure according to an embodiment of the present document.

FIG. 10 illustrates an exemplary LMCS structure according to an embodiment of the present document. The LMCS structure 1000 of FIG. 10 includes an in-loop mapping part 1010 of luma components based on adaptive piecewise linear (adaptive PWL) models and a luma-dependent chroma residual scaling part 1020 for chroma components. The dequantization and inverse transform 1011, reconstruction 1012, and intra prediction 1013 blocks of the in-loop mapping part 1010 represent processes applied in the mapped (reshaped) domain. Loop filters 1015, motion compensation or inter prediction 1017 blocks of the in-loop mapping part 1010, and reconstruction 1022, intra prediction 1023, motion compensation or inter prediction 1024, loop filters 1025 block of the chroma residual scaling part 1020 represent processes applied in the original (non-mapped, non-reshaped) domain.

As illustrated in FIG. 10, when LMCS is enabled, at least one of the inverse mapping (reshaping) process 1014, a forward mapping (reshaping) process 1018, and a chroma scaling process 1021 may be applied. For example, the inverse mapping process may be applied to a (reconstructed) luma sample (or luma samples or luma sample array) in a reconstructed picture. The inverse mapping process may be performed based on a piecewise function (inverse) index of a luma sample. The piecewise function (inverse) index may identify the piece to which the luma sample belongs. Output of the inverse mapping process is a modified (reconsturcted) luma sample (or modified luma samples or modified luma sample array). The LMCS may be enabled or disabled at a level of a tile group (or slice), picture or higher.

The forward mapping process and/or the chroma scaling process may be applied to generate the reconstructed picture. A picture may comprise luma samples and chroma samples. A reconstructed picture with luma samples may be referred to as a reconstructed luma picture, and a reconstructed picture with chroma samples may be referred to as a reconstructed chroma picture. A combination of the reconstructed luma picture and the reconstructed chroma picture may be referred to as a reconstructed picture. The reconstructed luma picture may be generated based on the forward mapping process. For example, if an inter prediction is applied to a current block, a forward mapping is applied to a luma prediction sample derived based on a (reconstructed) luma sample in a reference picture. Because the (reconstructed) luma sample in the reference picture is generated based on the inverse mapping process, the forward mapping may be applied to the luma prediction sample thus a mapped (reshaped) luma prediction sample can be derived. The forward mapping process may be performed based on a piecewise function index of the luma prediction sample. The piecewise function index may be derived based on the value of the luma prediction sample or the value of the luma sample in the reference picture used for inter prediction. If an intra prediction (or an intra block copy (IBC)) is applied to the current block, the forward mapping is not necessary because the inverse mapping process has not applied to the reconstructed samples in the current picture yet. A (reconstructed) luma sample in the reconstructed luma picture is generated based on the mapped luma prediction sample and a corresponding luma residual sample.

The reconstructed chroma picture may be generated based on the chroma scaling process. For example, a (reconstructed) chroma sample in the reconstructed chroma picture may be derived based on a chroma prediction sample and a chroma residual sample ($c_{res}$) in a current block. The chroma residual sample ($c_{res}$) is derived based on a (scaled) chroma residual sample ($c_{resScale}$) and a chroma residual scaling factor (cScaleInv may be referred to as varScale) for the current block. The chroma residual scaling factor may be calculated based on reshaped luma prediction sample values for the current block. For example, the scaling factor may be calculated based on an average luma value ave($Y'_{pred}$) of the reshaped luma prediction sample values $Y'_{pred}$. For a reference, in FIG. 10, the (scaled) chroma residual sample derived based on the inverse transform/dequantization may be referred to as $c_{resScale}$, and the chroma residual sample derived by performing the (inverse) scaling process to the (scaled) chroma residual sample may be referred to as $c_{res}$.

Figure 11:
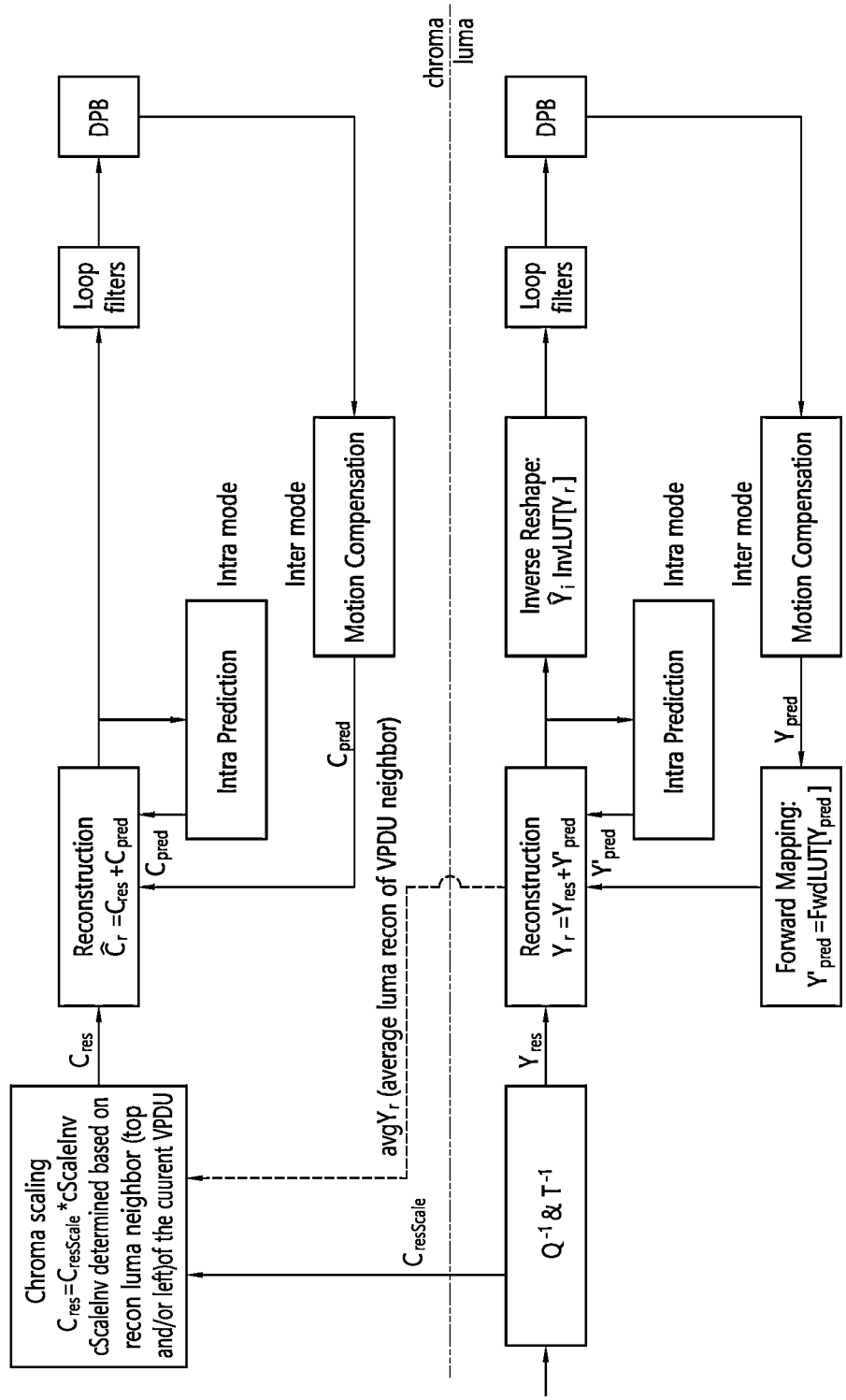
FIG. 11 illustrates an LMCS structure according to another embodiment of the present document.

FIG. 11 illustrates an LMCS structure according to another embodiment of the present document. FIG. 11 is described with reference to FIG. 10. Here, the difference between the LMCS structure of FIG. 11 and the LMCS structure 1000 of FIG. 10 is mainly described. The in-loop mapping part and the luma-dependent chroma residual scaling part of FIG. 11 may operate the same as (similarly to) the in-loop mapping part 1010 and the luma-dependent chroma residual scaling part 1020 of FIG. 10.

Referring to FIG. 11, a chroma residual scaling factor may be derived based on luma reconstructed samples. In this case, an average luma value (avgYr) may be obtained (derived) based on the neighboring luma reconstructed samples outside the reconstructed block, not the inner luma reconstructed samples of the reconstructed block, and the chroma residual scaling factor is derived based on the average luma value (avgYr). Here, the neighboring luma reconstructed samples may be neighboring luma reconstructed samples of the current block, or may be neighboring luma reconstructed samples of virtual pipeline data units (VPDUs) including the current block. For example, when intra prediction is applied to the target block, reconstructed samples may be derived based on prediction samples which are derived based on the intra prediction. In the other example, when inter prediction is applied to the target block, the forward mapping is applied to prediction samples which are derived based on the inter prediction, and reconstructed samples are generated (derived) based on the reshaped (or forward mapped) luma prediction samples.

The video/image information signaled through the bitstream may include LMCS parameters (information on LMCS). LMCS parameters may be configured as high level syntax (HLS, including slice header syntax) or the like. Detailed description and configuration of the LMCS parameters will be described later. As described above, the syntax tables described in the present document (and the following embodiments) may be configured/encoded at the encoder end and signaled to the decoder end through a bitstream. The decoder may parse/decode information on the LMCS (in the form of syntax elements) in the syntax tables. One or more embodiments to be described below may be combined. The encoder may encode the current picture based on the information about the LMCS and the decoder may decode the current picture based on the information about the LMCS.

The in-loop mapping of luma components may adjust the dynamic range of the input signal by redistributing the codewords across the dynamic range to improve compression efficiency. For luma mapping, a forward mapping (reshaping) function (FwdMap) and an inverse mapping (reshaping) function (InvMap) corresponding to the forward mapping function (FwdMap) may be used. The FwdMap function may be signaled using a piece-wise linear models, for example, the piece-wise linear model may have 16 pieces or bins. The pieces may have the equal length. In one example, the InvMap function does not need to be signalled and is instead derived from the FwdMap function. That is, the inverse mapping may be a function of the forward mapping. For example, the inverse mapping function may be mathematically built as the symmetric function of the forward mapping as reflected by the line y=x.

An in-loop (luma) reshaping may be used to map input luma values (samples) to altered values in the reshaped domain. The reshaped values may be coded and then mapped back into the original (un-mapped, un-reshaped) domain after reconstruction. To compensate for the interaction between the luma signal and the chroma signal, chroma residual scaling may be applied. In-loop reshaping is done by specifying high level syntax for the reshaper model. The reshaper model syntax may signal a piece-wise linear model (PWL model). For example, the reshaper model syntax may signal a PWL model with 16 bins or pieces of equal lengths. A forward lookup table (FwdLUT) and/or an inverse lookup table (InvLUT) may be derived based on the piece-wise linear model. For example, the PWL model pre-computes the 1024-entry forward (FwdLUT) and inverse (InvLUT) look up tables (LUT)s. As an example, when the forward lookup table FwdLUT is derived, the inverse lookup table InvLUT may be derived based on the forward lookup table FwdLUT. The forward lookup table FwdLUT may map the input luma values Yi to the altered values Yr, and the inverse lookup table InvLUT may map the altered values Yr to the reconstructed values Y'i. The reconstructed values Y'i may be derived based on the input luma values Yi.

In one example, the SPS may include the syntax of Table 13 below. The syntax of Table 13 may include sps_reshaper_enabled_flag as a tool enabling flag. Here, sps_reshaper_enabled_flag may be used to specify whether the reshaper is used in a coded video sequence (CVS). That is, sps_reshaper_enabled_flag may be a flag for enabling reshaping in the SPS. In one example, the syntax of Table 13 may be a part of the SPS.

TABLE 13

| | Descriptor |
|---|---|
| seq_parameter_set_rbsp( ) { | |
|   sps_seq_parameter_set_id | ue(v) |
|   ... | |
|   sps_reshaper_enabled_flag | u(1) |
|   rbsp_trailing_bits( ) | |
| } | |

In one example, semantics on syntax elements sps_seq_parameter_set_id and sps_reshaper_enabled_flag may be as shown in Table 14 below.

TABLE 14 sps_seq_parameter_set_id provides an identifier for the SPS for reference by other syntax elements.
sps_reshaper_enabled_flag equal to 1 specifies that reshaper is used in the coded video sequence (CVS). sps_reshaper_enabled_flag equal to 0 specifies that reshaper is not used in the CVS In one example, the tile group header or the slice header may include the syntax of Table 15 or Table 16 below.

TABLE 15

|  | Descriptor |
|---|---|
| tile_group_header( ) { |  |
|   tile_group_pic_parameter_set_id | ue(v) |
|   ... |  |
|   if( num_tiles_in_tile_group_minus1 > 0 ) { |  |
|     offset_len_minus1 | ue(v) |
|     for( i = 0; i < num_tiles_in_tile_group_minus1; i++ ) |  |
|       entry_point_offset_minus1[ i ] | u(v) |
|   } |  |
|   if ( sps_reshaper_enabled_flag ) { |  |
|     tile_group_reshaper_model_present_flag | u(1) |
|     if ( tile_group_reshaper_model_present_flag ) |  |
|       tile_group_reshaper_model ( ) |  |
|     tile_group_reshaper_enable_flag | u(1) |
|     if ( tile_group_reshaper_enable_flag && (!( qtbtt_dual_tree_intra_flag && tile_group_type == 1 ) ) ) |  |
|       tile_group_reshaper_chroma_residual_scale_flag | u(1) |
|   } |  |
|   byte_alignment( ) |  |
| } |  |

TABLE 16

|  | Descriptor |
|---|---|
| slice_header( ) { |  |
|   slice_pic_parameter_set_id | ue(v) |
|   ... |  |
|   if( num_tiles_in_slice_minus1 > 0 ) { |  |
|     offset_len_minus1 | ue(v) |
|     for( i = 0; i < num_tiles_in_slice_minus1; i++ ) |  |
|       entry_point_offset_minus1[ i ] | u(v) |
|   } |  |
|   if ( sps_reshaper_enabled_flag ) { |  |
|     slice_reshaper_model_present_flag | u(1) |
|     if ( slice_reshaper_mode_present_flag ) |  |
|       slice_reshaper_model ( ) |  |
|     slice_reshaper_enable_flag | u(1) |
|     if ( slice_reshaper_enable_flag && (!( qtbtt_dual_tree_intra_flag && slice_type == I ) ) ) |  |
|       slice_reshaper_chroma_residual_scale_flag | u(1) |
|   } |  |
|   byte_alignment( ) |  |
| } |  |

Semantics of syntax elements included in the syntax of Table 15 or Table 16 may include, for example, matters disclosed in the following tables.

TABLE 17 tile_group_reshaper_model_present_flag equal to 1 specifies tile_group_reshaper_model ( ) is present in tile group header, tile_group_reshaper_model_present_flag equal to 0 specifies tile group reshaper model( ) is not present in tile group header. When tile_group_reshaper_model_present_flag is not present, it is inferred to be equal to 0.
tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.
tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.

TABLE 18 slice_reshaper_model_present_flag equal to 1 specifies slice_reshaper_model( ) is present in slice header. slice_reshaper_model_present_flag equal to 0 specifies slice_reshaper_model( ) is not present in slice header. When slice_reshaper_model_present_flag is not present, it is inferred to be equal to 0.
slice_reshaper_enabled_flag equal to 1 specifies that reshaper is enabled for the current slice. slice_reshaper_enabled_flag equal to 0 specifies that reshaper is not enabled for the current slice. When slice_reshaper_enable_flag is not present, it is inferred to be equal to 0.
slice_reshaper_chroma_residual_scale_flag equal to 1 specifies that chroma residual scaling is enabled for the current slice. slice_reshaper_chroma_residual_scale_flag equal to 0 specifies that chroma residual scaling is not enabled for the current slice. When slice_reshaper_chroma_residual_scale_flag is not present, it is inferred to be equal to 0.

As one example, once the flag enabling the reshaping (i.e., sps_reshaper_enabled_flag) is parsed in the SPS, the tile group header may parse additional data (i.e., information included in Table 15 or 16 above) which is used to construct lookup tables (FwdLUT and/or InvLUT). In order to do this, the status of the SPS reshaper flag (sps_reshaper_enabled- _flag) may be first checked in the slice header or the tile group header. When sps_reshaper_enabled_flag is true (or 1), an additional flag, i.e., tile_group_reshaper_model_present_flag (or slice_reshaper_model_present_flag) may be parsed. The purpose of the tile_group_reshaper_model_present_flag (or slice_reshaper_model_present_flag) may be to indicate the presence of the reshaping model. For example, when tile_group_reshaper_model_present_flag (or slice_reshaper_model_present_flag) is true (or 1), it may be indicated that the reshaper is present for the current tile group (or current slice). When tile_group_reshaper_model_present_flag (or slice_reshaper_model_present_flag) is false (or 0), it may be indicated that the reshaper is not present for the current tile group (or current slice).

If the reshaper is present and the reshaper is enabled in the current tile group (or current slice), the reshaper model (i.e., tile_group_reshaper_model( ) or slice_reshaper_model( )) may be processed. Further to this, an additional flag, tile_group_reshaper_enable_flag (or slice_reshaper_enable_flag) may also be parsed. The tile_group_reshaper_enable_flag (or slice_reshaper_enable_flag) may indicate whether the reshaping model is used for the current tile group (or slice). For example, if tile_group_reshaper_enable_flag (or slice_reshaper_enable_flag) is 0 (or false), it may be indicated that the reshaping model is not used for the current tile group (or the current slice). If tile_group_reshaper_enable_flag (or slice_reshaper_enable_flag) is 1 (or true), it may be indicated that the reshaping model is used for the current tile group (or slice).

As one example, tile_group_reshaper_model_present_flag (or slice_reshaper_model_present_flag) may be true (or 1) and tile_group_reshaper_enable_flag (or slice_reshaper_enable_flag) may be false (or 0). This means that the reshaping model is present but not used in the current tile group (or slice). In this case, the reshaping model can be used in the future tile groups (or slices). As another example, tile_group_reshaper_enable_flag may be true (or 1) and tile_group_reshaper_model_present_flag may be false (or 0). In such a case, the decoder uses the reshaper from the previous initialization.

When the reshaping model (i.e., tile_group_reshaper_model( ) or slice_reshaper_model( ) and tile_group_reshaper_enable_flag (or slice_reshaper_enable_flag) are parsed, it may be determined (evaluated) whether conditions necessary for chroma scaling are present. The above conditions includes a condition 1 (the current tile group/slice has not been intra-coded) and/or a condition 2 (the current tile group/slice has not been partitioned into two separate coding quad tree structures for luma and chroma, i.e. the block structure for The current tile group/slice is not a dual tree structure). If the condition 1 and/or the condition 2 are true and/or tile_group_reshaper_enable_flag (or slice_reshaper_enable_flag) is true (or 1), then tile_group_reshaper_chroma_residual_scale_flag (or slice_reshaper_chroma_residual_scale_flag) may be parsed. When tile_group_reshaper_chroma_residual_scale_flag (or slice_reshaper_chroma_residual_scale_flag) is enabled (if 1 or true), it may be indicated that chroma residual scaling is enabled for the current tile group (or slice). When tile_group_reshaper_chroma_residual_scale_flag (or slice_reshaper_chroma_residual_scale_flag) is disabled (if 0 or false), it may be indicated that chroma residual scaling is disabled for the current tile group (or slice).

The purpose of the tile group reshaping model is to parse the data that would be necessary to construct the lookup tables (LUTs). These LUTs are constructed on the idea that the distribution of an allowable range of luma values can be divided into a plurality of bins (ex. 16 bins) which can be represented using a set of 16 PWL system of equations. Therefore, any luma value that lies within a given bin can be mapped to an altered luma value.

Figure 12:
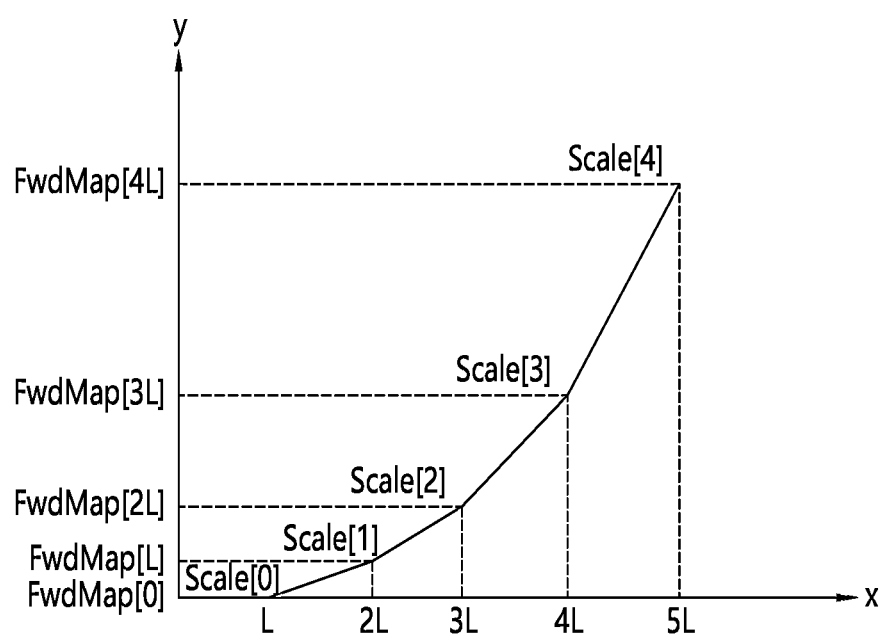
FIG. 12 shows a graph representing an exemplary forward mapping.

FIG. 12 shows a graph representing an exemplary forward mapping. In FIG. 12, five bins are illustrated exemplarily.

Referring to FIG. 12, the x-axis represents input luma values, and the y-axis represents altered output luma values. The x-axis is divided into 5 bins or slices, each bin of length L. That is, the five bins mapped to the altered luma values have the same length. The forward lookup table (FwdLUT) may be constructed using data (i.e., reshaper data) available from the tile group header, and thus mapping may be facilitated.

In one embodiment, output pivot points associated with the bin indices may be calculated. The output pivot points may set (mark) the minimum and maximum boundaries of the output range of the luma codeword reshaping. The calculation process of the output pivot points may be performed by computing a piecewise cumulative distribution function (CDF) of the number of codewords. The output pivot range may be sliced based on the maximum number of bins to be used and the size of the lookup table (FwdLUT or InvLUT). As one example, the output pivot range may be sliced based on a product between the maximum number of bins and the size of the lookup table (size of LUT*maximum number of bin indices). For example, if the product between the maximum number of bins and the size of the lookup table is 1024, the output pivot range may be sliced into 1024 entries. This serration of the output pivot range may be performed (applied or achieved) based on (using) a scaling factor. In one example, the scaling factor may be derived based on Equation 3 below.

$$SF=(y2-y1)*(1<<\text{FP\_PREC})+c \qquad \text{[Equation 3]}$$

In Equation 3, SF denotes a scaling factor, and y1 and y2 denote output pivot points corresponding to each bin. Also, FP_PREC and c may be predetermined constants. The scaling factor determined based on Equation 3 may be referred to as a scaling factor for forward reshaping.

In another embodiment, with respect to inverse reshaping (inverse mapping), for a defined range of the bins to be used (i.e., from reshaper_model_min_bin_idx to reshape_model_max_bin_idx), the input reshaped pivot points which correspond to the mapped pivot points of the forward LUT and the mapped inverse output pivot points (given by bin index under consideration*number of initial codewords) are fetched. In another example, the scaling factor SF may be derived based on Equation 4 below.

$$SF=(y2-y1)*(1<<\text{FP\_PREC})/(x2-x1) \qquad \text{[Equation 4]}$$

In Equation 4, SF denotes a scaling factor, x1 and x2 denote input pivot points, and y1 and y2 denote output pivot points corresponding to each piece (bin) (output pivot points of the inverse mapping). Here, the input pivot points may be pivot points mapped based on a forward lookup table (FwdLUT), and the output pivot points may be pivot points inverse-mapped based on an inverse lookup table (InvLUT). Also, FP_PREC may be a predetermined constant value. FP_PREC of Equation 4 may be the same as or different from FP_PREC of Equation 3. The scaling factor determined based on Equation 4 may be referred to as a scaling factor for inverse reshaping. During inverse reshaping, partitioning of input pivot points may be performed based on the scaling factor of Equation 4. The scaling factor SF is used to slice the range of input pivot points. Based on the partitioned input pivot points, bin indices in the range from 0 to the minimum bin index (reshaper_model_min_bin_idx) and/or from the minimum bin index (reshaper_model_min_bin_idx) to the maximum bin index (reshape_model_max_bin_idx) are assigned the pivot values that correspond to the minimum and maximum bin values.

Table 19 below shows the syntax of the reshaper model according to an embodiment. The reshaper model may be referred to as a reshaping model or an LMCS model. Here, the reshaper model has been exemplarily described as a tile group reshaper, but the present document is not necessarily limited by this embodiment. For example, the reshaper model may be included in the APS, or the tile group reshaper model may be referred to as a slice reshaper model or LMCS data. Also, the prefix reshaper_model or Rsp may be used interchangeably with lmcs. For example, in the following tables and the description below, reshaper_model_min_bin_idx, reshaper_model_delta_max_bin_idx, reshaper_model_max_bin_idx, RspCW, RsepDeltaCW may be used interchangeably with lmcs_min_bin_idx, lmcs_delta_cs_bin_idx, lmx, lmcs_delta_csDcselta_idx, lmx, respectively.

TABLE 19

| | Descriptor |
|---|---|
| tile_group_reshaper_model ( ) { | |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++ ) { | |
|     reshape_model_bin_delta_abs_CW [ i ] | u(v) |
|     if ( reshaper_model_bin_delta_abs_CW[ i ] ) > 0 ) | |
|       reshaper_model_bin_delta_sign_CW_flag[ i ] | u(1) |
|   } | |
| } | |

The semantics of syntax elements included in the syntax of Table 19 may include, for example, descriptions in the following table.

TABLE 20 reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.
reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx − reshape_model_delta_max_bin_idx.
reshaper_model_bin_delta_abs_cw_prec_minus1 plus 1 specifies the number of bits used for the representation of the syntax reshape_model_bin_delta_abs_CW[ i ].
reshape_model_bin_delta_abs_CW[ i ] specifies the absolute delta codeword value for the ith bin.
reshaper_model_bin_delta_sign_CW_flag[ i ] specifies the sign of reshape_model_bin_delta_abs_CW[ i ] as follows:
− If reshape_model_bin_delta_sign_CW_flag[ i ] is equal to 0, the corresponding variable RspDeltaCW[ i ] is a positive value.
− Otherwise ( reshape_model_bin_delta_sign_CW_flag[ i ] is not equal to 0 ), the corresponding variable RspDeltaCW[ i ] is a negative value.
When reshape_model_bin_delta_sign_CW_flag[ i ] is not present, it is inferred to be equal to 0.

The reshaper model includes reshape_model_min_bin_idx, reshape_model_delta_max_bin_idx, reshape_model_bin_delta_abs_cw_prec_minus1, reshape_model_bin_delta_abs_CW[i], and reshaper_model_bin_delta_sign_CW as elements. Hereinafter, each syntax element will be described in detail.

reshape_model_min_bin_idx indicates the minimum bin (or piece) index used in the reshaper configuring (constructing) process. The value of reshape_model_min_bin_idx may range from 0 to MaxBinIdx. For example, MaxBinIdx may be 15.

In an embodiment, the tile group reshaper model may preferentially parse two indices (or parameters), reshaper_model_min_bin_idx and reshaper_model_delta_max_bin_idx. A maximum bin index (reshaper_model_max_bin_idx) may be derived (determined) based on these two indices. The reshape_model_delta_max_bin_idx may represent the value derived by subtracting the actual maximum bin index (reshape_model_max_bin_idx), used in the reshaper configuration process, from the allowed maximum bin index MaxBinIdx. A value of the maximum bin index (reshape_model_max_bin_idx) may range from 0 to MaxBinIdx. For example, MaxBinIdx may be 15. As an example, the value of reshape_model_max_bin_idx may be derived based on Equation 5 below.

$$\text{reshape\_model\_max\_bin\_idx} = \text{MaxBinIdx} - \text{reshape\_model\_delta\_max\_bin\_idx}. \quad [\text{Equation 5}]$$

The maximum bin index reshape_model_max_bin_idx may be greater than or equal to the minimum bin index reshape_model_min_bin_idx. The minimum bin index may be referred to as a minimum allowed bin index or a allowed minimum bin index, and the maximum bin index may also be referred to as a maximum allowed bin index or a allowed maximum bin index.

If the maximum bin index (rehape_model_max_bin_idx) is derived, the syntax element reshaper_model_bin_delta_abs_cw_prec_minus1 may be parsed. The number of bits used to represent the syntax reshape_model_bin_delta_abs_CW[i] may be determined based on reshaper_model_bin_delta_abs_cw_prec_minus1. For example, the number of bits used to represent reshape_model_bin_delta_abs_CW[i] may be equal to 1 plus reshaper_model_bin_delta_abs_cw_prec_minus1.

reshape_model_bin_delta_abs_CW[i] may indicate information related to the absolute delta codeword value (absolute value of the delta codeword) of the i-th bin. In one example, if the absolute delta codeword value of the i-th bin is greater than 0, reshape_model_bin_delta_sign_CW_flag[i] may be parsed. A sign of reshape_model_bin_delta_abs_CW[i] may be determined based on reshaper_model_bin_delta_sign_CW_flag[i]. In one example, if reshaper_model_bin_delta_sign_CW_flag[i] is 0 (or false), the corresponding variable RspDeltaCW[i] may be a positive sign. In other cases (if reshaper_model_bin_delta_sign_CW_flag[i] is not 0, if reshaper_model_bin_delta_sign_CW_flag[i] is 1 (or true)), the corresponding variable RspDeltaCW[i] may be a negative sign. If reshape_model_bin_delta_sign_CW_flag[i] is not present, it may be inferred to be equal to 0 (or false).

In an embodiment, the variable RspDeltaCW[i] may be derived based on reshape_model_bin_delta_abs_CW[i] and reshape_model_bin_delta_sign_CW_flag[i] described above. RspDeltaCW[i] may be referred to as a value of a delta codeword. For example, RspDeltaCW[i] may be derived based on Equation 6 below.

$$\text{RspDeltaCW}[i] = (1 - 2 \ast \text{reshape\_model\_bin\_delta\_sign\_CW}[i]) \ast \text{reshape\_model\_bin\_delta\_abs\_CW}[i] \quad [\text{Equation 6}]$$

In Equation 6, reshape_model_bin_delta_sign_CW[i] may be information related to a sign of RspDeltaCW[i]. For example, reshape_model_bin_delta_sign_CW[i] may be the same as reshaper_model_bin_delta_sign_CW_flag[i] described above. Here, i may be in a range from a minimum bin index (reshaper_model_min_bin_idx) to a maximum bin index (reshape_model_max_bin_idx).

A variable (or array) RspCW[i] may be derived based on RspDeltaCW[i]. Here, RspCW[i] may indicate the number of codewords allocated (distributed) to the i-th bin. That is, the number of codewords allocated (distributed) to each bin may be stored in an array form. In one example, if i is smaller than the reshaper_model_min_bin_idx or larger than reshaper_model_max_bin_idx (i<reshaper_model_min_bin_idx or reshaper_model_max_bin_idx<i), RspCW[i] may be equla to 0. Otherwise (if i is greater than or equal to reshaper_model_min_bin_idx described above and less than or equal to reshaper_model_max_bin_idx (reshaper_model_min_bin_idx<=i<=reshaper_model_max_bin_idx), RspCW[i] may be derived based on the above-described RspDeltaCW[i], the luma bit depth (BitDepthY), and/or MaxBinIdx. In this case, for example, RspCW[i] may be derived based on Equation 7 below.

$$RspCW[i]=OrgCW+RspDeltaCW[i] \quad \text{[Equation 7]}$$

In Equation 7, OrgCW may be a predetermined value, for example, may be determined based on Equation 8 below.

$$OrgCW=(1<<BitDepth_Y)/(MaxBinIdx+1) \quad \text{[Equation 8]}$$

In Equation 8, BitDepthY is the luma bit depth, and MaxBinIdx represents the allowable maximum bin index. In one example, if BitDepthY is 10, RspCW[i] may have a value from 32 to 2*OrgCW−1.

A variable InputPivot[i] may be derived based on the OrgCW. For example, InputPivot[i] may be derived based on Equation 9 below.

$$InputPivot[i]=i*OrgCW \quad \text{[Equation 9]}$$

Variables ReshapePivot[i], ScaleCoef[i], and/or InvScaleCoeff[i] may be derived based on the above-described RspCW[i], InputPivot[i], and/or OrgCW, for example, ReshapePivot[i] ], ScaleCoef[i], and/or InvScaleCoeff[i] may be derived based on Table 21 below.

TABLE 21 shiftY = 14
ReshapePivot[ 0 ] = 0;
for( i = 0; i <= MaxBinIdx ; i++) {
   ReshapePivot[ i + 1 ] = ReshapePivot[ i ] + RspCW[ i ]
   ScaleCoef[ i ] = ( RspCW[ i ] * (1 << shiftY) + (1 << (Log2(OrgCW) − 1))) >> (Log2(OrgCW))
   if ( RspCW[ i ] == 0 )
     InvScaleCoeff[ i ] = 0
   else
     InvScaleCoeff[ i ] = OrgCW * (1 << shiftY) / RspCW[ i ]
}

In Table 21, the for loop syntax in which i increases from 0 to MaxBinIdx may be used, and shiftY may be a predetermined constant for bit shifting. Whether InvScaleCoeff[i] is derived based on RspCW[i] may be determined based on a conditional clause according to whether RspCW[i] is 0.

ChromaScaleCoef[i] for deriving the chroma residual scaling factor may be derived based on Table 22 below.

TABLE 22

ChromaResidualScaleLut[64] = {16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, TABLE 22-continued 1170, 1170, 1170, 1170, 1092, 1092, 1092, 1092, 1024, 1024, 1024, 1024},
shiftC = 11
− if ( RspCW[ i ] == 0 )
   ChromaScaleCoef [ i ] = (1 << shiftC)
− Otherwise (RspCW[ i ] != 0),
   ChromaScaleCoet[ i ] = ChromaResidualScaleLut[RspCW[ i ] >> 1]

In Table 22, shiftC may be a predetermined constant for bit shifting. Referring to Table 22, whether ChromaScaleCoef[i] is derived based on the array ChromaResidualScaleLut may be determined based on a conditional clause according to whether RspCW[i] is 0. Here, ChromaResidualScaleLut may be a predetermined array. However, the array ChromaResidualScaleLut is merely exemplary, and the present embodiment is not necessarily limited by Table 22.

A method for deriving the i-th variables has been described above. The i+l-th variables may be based on ReshapePivot[i+1], and for example, ReshapePivot[i+1] may be derived based on Equation 10.

$$ReshapePivot[i+1]=ReshapePivot[i]+RspCW[i] \quad \text{[Equation 10]}$$

In Equation 10, RspCW[i] may be derived based on Equations 7 and/or 8 described above. Luma mapping may be performed based on the above-described embodiments and examples, and the above-described syntax and elements included therein may be merely exemplary representations, and embodiments are not limited by the above-mentioned tables or equations.

The (luma-dependent) chroma residual scaling is designed to compensate for the interaction between the luma signal and its corresponding chroma signals. For example, whether chroma residual scaling is enabled or not is also signalled at the tile group level or the slice level. In one example, if luma mapping is enabled and if dual tree partition (also known as separate chroma tree) is not applied to the current tile group, an additional flag is signalled to indicate if the luma-dependent chroma residual scaling is enabled or not. In other example, when luma mapping is not used, or when dual tree partition is used in the current tile group, luma-dependent chroma residual scaling is disabled. In another example, the luma-dependent chroma residual scaling is always disabled for the chroma blocks whose area is less than or equal to 4.

Chroma residual scaling may be performed based on an average luma value of reference samples. For example, the reference samples may include samples of a corresponding luma prediction block (a luma component of a prediction block to which intra prediction and/or inter prediction is applied). When the inter prediction is applied, the reference samples may include samples after forward mapping is applied to the luma component prediction samples. Alternatively, the reference samples may include neighboring samples of the current block or neighboring samples of a VPDU including the current block. In this case, when the inter prediction is applied to the neighboring block including the neighboring samples, the neighboring samples may include luma component reconstruction samples derived based on the luma component prediction samples to which the forward mapping of the neighboring block is applied. Scaling operations at the encoder side and/or the decoder side may be implemented as, for example, fixed-point integer operations based on Equation 11 below.

$$c'=sign(c)*((abs(c)*s+2CSCALE\_FP\_PREC-1)>>CSCALE\_FP\_PREC) \quad \text{[Equation 11]}$$

In Equation 11, c' denotes a scaled chroma residual sample (scaled chroma component of a residual sample), c denotes a chroma residual sample (chroma component of residual sample), s denotes a chroma residual scaling factor, and CSCALE_FP_PREC denotes a (predefined) constant value.

As described above, the average luma value of the reference samples may be obtained, and the chroma residual scaling factor may be derived based on the average luma value. As described above, the chroma component residual samples may be scaled based on the chroma residual scaling factor, and a chroma component reconstructed sample may be generated based on the scaled chroma component residual samples.

In an embodiment of the present document, a signaling structure for efficiently applying the above-described ALF and/or LMCS is proposed. According to an embodiment of the present document, for example, ALF data and/or LMCS data (i.e., reshaper model) may be included in the HLS (i.e., APS) and/ or the header information (i.e., picture header, slice header) that is a lower level of the APS, and whether to derive the ALF data and/or the LMCS model (reshaper model) included in the APS or whether to parse the ALF data and/or the LMCS model (reshaper model) included in header information into the current header may be adaptively controlled by signaling the referenced APS ID. That is, the ALF data and/or the LMCS model (reshaper model) may be conditionally parsed in the header (tile, picture, or slice). The LMCS model (reshaper model) may be derived based on LMCS parameters.

For example, the following table shows an example of a parameter set according to an embodiment.

TABLE 23

|  | Descriptor |
| --- | --- |
| adaptation_parameter_set_rbsp( ){ |  |
|   adaptation_parameter_set_id | ue(v) |
|   alf_data( ) |  |
|   reshaper_model( ) |  |
|   if( aps_extension_flag ) |  |
|     while( more_rbsp_data( ) ) |  |
|       aps_extension_data_flag | u(1) |
|   rbsp_trailing_bits( ) |  |
| } |  |

For example, the following table shows an example of header information according to an embodiment.

TABLE 24

|  | Descriptor |
| --- | --- |
| tile_group_header( ) { |  |
|   tile_group_pic_parameter_set_id | ue(v) |
|   ... |  |
|   if (sps_alf_enabled_flag) { |  |
|     tile_group_alf_enabled_flag | u(1) |
|     if(tile_group_alf_enabled_flag){ |  |
|       tile_group_alf_usage_flag | u(1) |
|       if(tile_group_alf_usage_flag){ |  |
|         alf_data( ) |  |
|       } else { |  |
|         tile_group_aps_id_alf | u(5) |
|       } |  |
|     } |  |
|   } |  |
|   if (sps_reshaper_enabled_flag) { |  |
|     tile_group_reshaper_model_present_flag | u(1) |
|     if(tile_group_reshaper_model_present_flag){ |  |
|       tile_group_resahper_usage_flag | u(1) |
|       if(tile_group_reshaper_usage_flag){ |  |
|         tile_group_reshaper_model( ) |  |
|       } else { |  |
|         tile_group_aps_id_reshaper | u(5) |
|       } |  |
|     } |  |
|     tile_group_reshaper_enable_flag | u(1) |
|     if ( tile_group_reshaper_enable_flag && (!( qtbtt_dual_tree_intra_flag && tile_group_type == I ) ) ) |  |
|       tile_group_reshaper_chroma_residual_scale_flag | u(1) |
|   } |  |
|   ... |  |
|   byte_alignment( ) |  |
| } |  |

Semantics of syntax elements included in the syntax of Table 24 may include, for example, matters disclosed in the following table.

TABLE 25 tile_group_alf_usage_flag equal to 0 specifies that the APS id is specified by tile_group_aps_id_alf.
tile_group_alf_usage_flag equal to 1 specifies that the APS id is not used and the alf_data( ) is parsed in the current tile group header.
tile_group_reshaper_usage_flag equal to 0 specifies that the APS id is specified by tile_group_aps_id_reshaper.
tile_group_reshaper_usage_flag equal to 1 specifies that the APS id is not used and the tile_group_reshaper_model( ) is parsed in the current tile group header.
tile_group_aps_id_alf specifies the adaptation_parameter_set_id of the APS that the tile group refers to access the ALF data.
The TemporalId of the APS NAL unit having adaptation_parameter_set_id equal to
tile_group_aps_id_alf shall be less than or equal to the Temporal id of the coded tile group NAL unit.

TABLE 25-continued

When multiple APSs with the same value of adaptation_parameter_set_id are referred to by two or more tile groups of the same picture, the multiple
APSs with the same value of adaptation_parameter_set_id shall have the same content.
tile_group_aps_id_reshaper specifies the adaptation_parameter_set_id of the APS that the tile group refers to access the reshaper data.
The TemporalId of the APS NAL unit having adaptation_parameter_set_id equal to tile_group_aps_id_reshaper shall be less than or equal to the TemporalId of the coded tile group NAL unit.
When multiple APSs with the same value of adaptation_parameter_set_id are referred to by two or more tile groups of the same picture, the multiple
APSs with the same value of adaptation_parameter_set_id shall have the same content.

For example, referring to Table 24, the header information may include ALF related information. The ALF related information may include an ALF enabled flag syntax element (ex. tilegroup_alf_enabled_flag), an ALF use flag syntax element for controlling the use of ALF data (ex. tile_group_alf_usage_flag), an ALF data syntax element for conditionally parsed and used (ex. alf_data( )), and an ALF related APS ID syntax element (ex. tile_group_aps_id_alf).

Also, the header information may include reshaping related information. The ALF related information may include, for example, a reshaper model present flag syntax element (ex. tilegroup_reshaper_model_present_flag), a reshaper use flag syntax element for controlling the use of the reshaper model (ex. tilegroup_resahper_usage_flag), an reshaper model syntax element for conditionally parsed and used (ex. tile_group_reshaper_model( )), a reshaper related APS ID syntax element (ex. tile_group_aps_id_reshaper), a reshaper enable flag syntax element (ex. tilegroup_reshaper_enable_flag), and a chroma residual scaling flag (ex. tilegroup_reshaper_shormca_residual_scale_flag).

According to the present embodiment, ALF data and/or LMCS model (reshaper model) may be conditionally parsed in a header (tile, picture, or slice).

For example, the availability of the ALF tool may be determined based on the ALF enabled flag (ex. sps_alf_enabled_flag) in the SPS, and then, whether the ALF is enabled in the current tile, picture or slice is indicated by the ALF enabled flag (ex. tile_group_alf_enabled_flag) in the header information. When the value of the ALF enable flag in the header information is 1, the ALF use flag syntax element may be parsed/signaled. In addition, it may be determined whether to parse the ALF data in the current header based on the ALF use flag syntax element. For example, when the value of the ALF use flag is 1, the ALF data may be parsed in the current header. On the other hand, when the value of the ALF use flag is 0, the ALF data may be derived from the APS indicated by the ALF related APS ID syntax element.

In addition, for example, it may be determined whether the reshaping tool is enabled by the reshaper enabled flag (ex. sps_reshaper_enabled_flag) in the SPS, and then whether the reshaper model is present in the current header is indicated by the reshaper model present flag (ex. tilegroup_reshaper_model_present_flag). When the value of the reshaper model present flag is 1, the reshaper use flag syntax element may be parsed/signaled. In addition, it may be determined whether to parse the reshaper model (LMCS data) in the current header based on the reshaper use flag syntax element. For example, when the value of the reshaper use flag is 1, the reshaper model may be parsed in the current header. On the other hand, when the value of the reshaper use flag is 0, the reshaper model may be derived from the APS indicated by the reshaper related APS ID syntax element.

The following drawings are created to explain specific examples of the present specification. Since the names of specific apparatus described in the drawings or the names of specific signals/messages/fields are presented by way of example, the technical features of the present specification are not limited to the specific names used in the following drawings.

Figure 13:
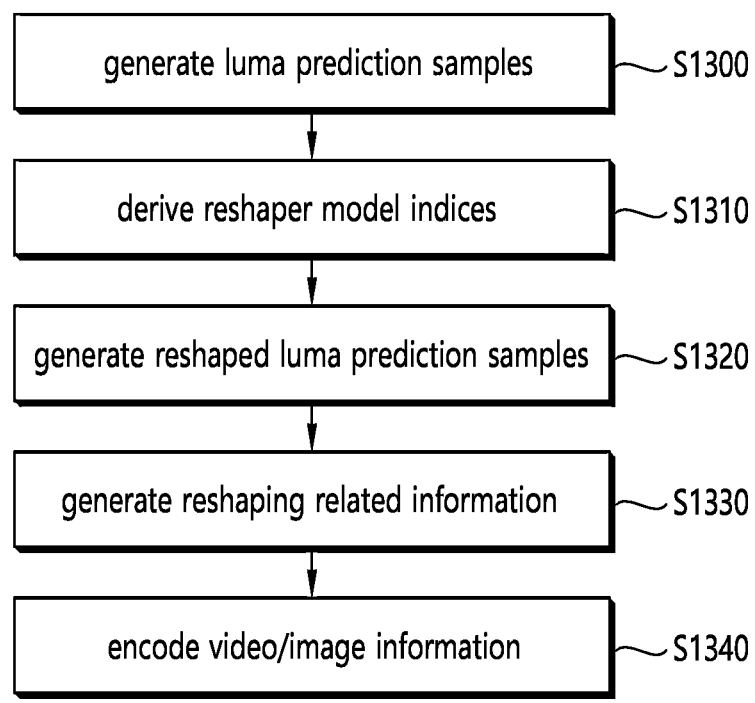
FIG. 13 and FIG. 14 schematically show an example of a video/image encoding method and related components according to embodiment(s) of the present document.
Figure 14:
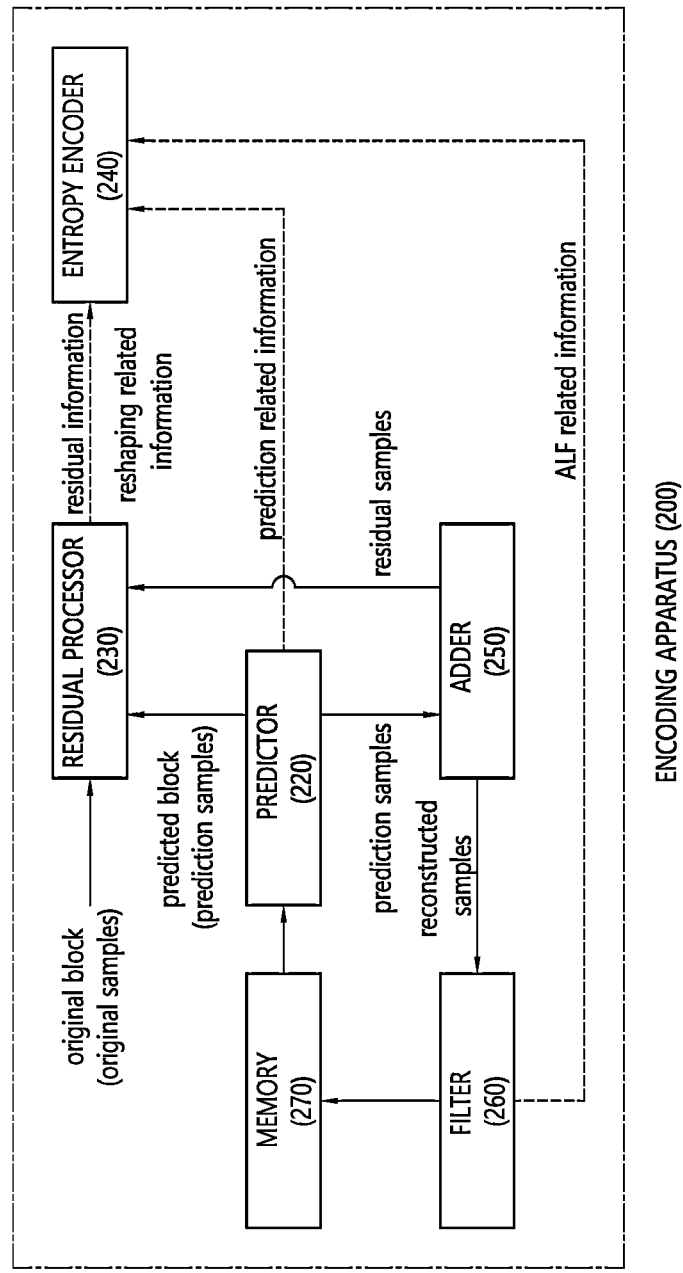

FIG. 13 and FIG. 14 schematically show an example of a video/image encoding method and related components according to embodiment(s) of the present document. The method disclosed in FIG. 13 may be performed by the encoding apparatus disclosed in FIG. 2. Specifically, for example, S1300 of FIG. 13 may be performed by the predictor 220 of the encoding apparatus, and S1310 to S1330 may be performed by the residual processor 230 of the encoding apparatus, and S1340 may be performed by the entropy encoder 240 of the encoding apparatus. The method disclosed in FIG. 13 may include the embodiments described above in the present document.

Referring to FIG. 13, the encoding apparatus may generate luma prediction samples of the current block in the current picture (S1300). In one example, the encoding apparatus may derive the prediction mode of the current block as the intra prediction mode or the inter prediction mode, and may derive luma prediction samples based on the prediction mode of the current block. In this case, various prediction methods disclosed in the present document, such as inter prediction or intra prediction, may be applied.

The encoding apparatus may derive reshaper model indices for reshaping the luma prediction samples (S1310). The reshaper model indices may include at least one of syntax elements included in reshaper model information (syntax) and header information (tile group header, picture header, or slice header). For example, the reshaper model indices may include the above-described reshaper_model_min_bin_idx, reshaper_model_delta_max_bin_idx, reshape_model_max_bin_idx, and MaxBinIdx.

The encoding apparatus may generate reshaped luma prediction samples based on the luma prediction samples and the reshaper model indices (S1320). The reshaped luma prediction samples may be generated based on forward reshaping or inverse reshaping. The reshaped luma prediction samples may be referred to as mapped luma prediction samples.

The encoding apparatus may generate reshaping related information (S1330). The reshaping related information may include the reshaping model information described above in the present document. For example, the reshaping related information may include information on reshaped luma prediction samples and information on reshaping model indices.

The encoding apparatus may encode video/image information (S1340). The image/video information may include information for generating the luma samples and/or information related to the reshaping. The information for generating the luma samples may include, for example, prediction related information, residual information, LMCS related information, and ALF related information. The prediction related information may include information on various prediction modes (i.e., merge mode, MVP mode, etc.), MVD information, and the like.

The encoded image/video information may be output in the form of a bitstream. The bitstream may be transmitted to the decoding apparatus through a network or a storage medium.

The image/video information may include various information according to an embodiment of the present document. For example, the image/video information may include at least one information or at least one syntax element disclosed in at least one of Tables 1, 3, 4, 7, 9, 13, 15, 16, 19, 23, and/or 24 described above.

For example, the image information may include the aforementioned adaptation parameter set (APS). The APS may include a reshaper model field. The reshaper model field may represent a reshaper model for reshaping. The reshaping model may include information for deriving indices for the reshaping.

The image information may include header information, the header information may include a reshaper enabled flag and reshaper related APS ID information, and the reshaper related APS ID information may represent the ID of the APS including the reshaper model field.

The header information includes a flag indicating whether to use the reshaper model field in the header information, and based on the flag indicating whether to use the reshaper model field in the header information, the reshaper model included in the APS indicated by the reshaper related APS ID information may be used for the reshaping.

In one example, based on the value of the flag indicating whether to use the reshaper model field in the header information being determined to be 0, the reshaper model, which is represented by the reshaper model field included in the APS indicated by the reshaper related APS ID information, may be used for the reshaping. In another example, an additional reshaper model field may be included in the header information based on a value of a flag indicating whether to use the reshaper model field in the header information being determined to be 1.

The image encoding method may further include performing chroma residual scaling based on the reshaped luma prediction samples. The header information may include a reshaper enabled flag. When the value of the reshaper enabled flag is determined to be 1 (when the value of the reshaper enabled flag is 1), the chroma residual scaling is performed and information on chroma residual scaling (i.e., chroma residual scaling flag) may be generated.

In one example, the encoding apparatus may generate reconstructed samples based on the reshaped luma prediction samples. The encoding apparatus may derive filter coefficients for the ALF on the reconstructed samples. The encoding apparatus may generate modified reconstructed samples based on the reconstructed samples and the filter coefficients. The encoding apparatus may generate ALF data based on the filter coefficients and/or the modified reconstructed samples.

In one example, the encoding apparatus may derive residual samples based on the reshaped prediction samples and the original samples. In this case, residual information may be derived based on the residual samples. Based on the residual information, (modified) residual samples may be derived. Reconstructed samples may be generated based on the (modified) residual samples. A reconstructed block and a reconstructed picture may be derived based on the reconstructed samples.

Figure 15:
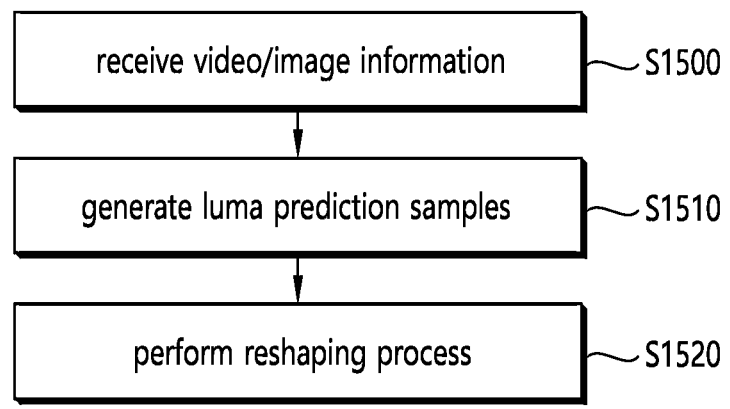
FIG. 15 and FIG. 16 schematically show an example of an image/video decoding method and related components according to an embodiment of the present document.
Figure 16:
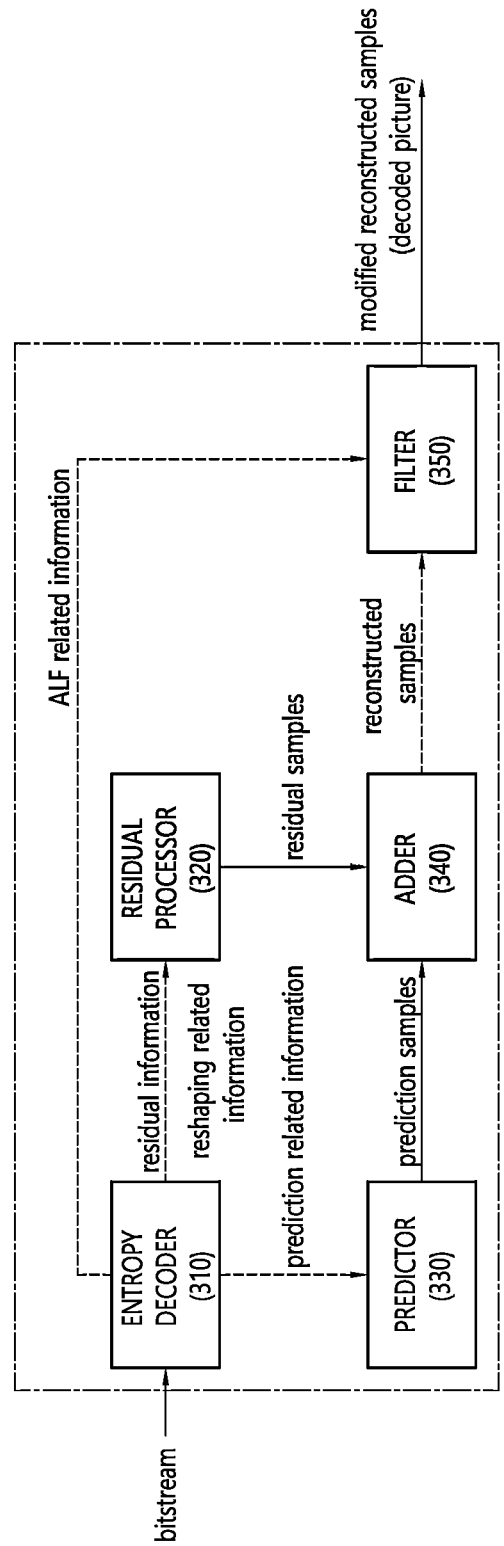

FIG. 15 and FIG. 16 schematically show an example of an image/video decoding method and related components according to an embodiment of the present document. The method disclosed in FIG. 15 may be performed by the decoding apparatus illustrated in FIG. 3. Specifically, for example, S1500 of FIG. 15 may be performed by the entropy decoder 310 of the decoding apparatus, S1510 may be performed by the residual processor 320 and/or the adder 340 of the decoding apparatus, and S1520 may be performed by the filter 350 of the decoding apparatus. The method disclosed in FIG. 15 may include the embodiments described above in the present document.

Referring to FIG. 15, the decoding apparatus may receive/obtain image/video information (S1500). The decoding apparatus may receive/obtain the image/video information through a bitstream.

The image/video information may include various information according to an embodiment of the present document. For example, the image/video information may include information disclosed in at least one of Tables 1, 3, 4, 7, 9, 13, 15, 16, 19, 23, and/or 24 described above.

The decoding apparatus may generate luma prediction samples of the current block in the current picture based on the image information (S1510). In this case, various prediction methods disclosed in the present document, such as inter prediction or intra prediction, may be applied.

The decoding apparatus may perform a reshaping process on the luma prediction samples (S1520). The decoding apparatus may derive reshaping model indices for the reshaping, and generate reshaped luma prediction samples based on the luma prediction samples and the reshaper model indices. The reshaper model indexes may include the above-described reshaper_model_min_bin_idx, reshaper_model_delta_max_bin_idx, reshape_model_max_bin_idx, and MaxBinIdx.

For example, the image information may include the aforementioned adaptation parameter set (APS). The APS may include a reshaper model field, a reshaper model may be derived based on the reshaper model field, and the reshaper model indices may be derived based on the reshaper model.

The image information may include header information, the header information may include a reshaper enabled flag and reshaper related APS ID information, and the reshaper related APS ID information may represent the ID of the APS including the reshaper model field.

The header information may include a flag indicating whether to use the reshaper model field in the header information, and based on the flag indicating whether to use the reshaper model field in the header information, the reshaper model included in the APS indicated by the reshaper related APS ID information may be used for the reshaping.

Based on the value of the flag indicating whether to use the reshaper model field in the header information being determined to be 0, the reshaper model, which is based on the reshaper model field included in the APS indicated by the reshaper related APS ID information, may be used for the reshaping, and an additional reshaper model field may be included in the header information based on a value of a flag indicating whether to use the reshaper model field in the header information being determined to be 1.

The image decoding method may further include performing chroma residual scaling based on the reshaped prediction samples and a chroma residual scaling flag. When it is determined that the value of the reshaper enabled flag is 1 (the value of the reshaper enabled flag is 1), the chroma residual scaling flag may be signaled.

The decoding apparatus may generate reconstructed samples based on the reshaped luma prediction samples. The decoding apparatus may perform the ALF process on the reconstructed samples. The decoding apparatus may derive filter coefficients for the ALF, and generate modified reconstructed samples based on the reconstructed samples and the filter coefficients. One filter may include a set of filter coefficients. The filter or the filter coefficients may be derived based on the ALF data.

For example, the image information may include the aforementioned adaptation parameter set (APS). The APS may include the ALF data, and the ALF data may include information for deriving filter coefficients for the ALF.

The header information may include an ALF enabled flag and ALF related APS ID information. The ALF related APS ID information may indicate the ID of the APS including the ALF data.

The header information may include a flag indicating whether to use the ALF data in the header information. Based on a flag indicating whether to use the ALF data in the header information, the ALF data included in the APS indicated by the ALF related APS ID information may be used for deriving the filter coefficients.

In one example, based on a determination that a value of the flag indicating whether to use the ALF data in the header information is 0, the ALF data included in the APS indicated by the ALF related APS ID information may be used for deriving the filter coefficients. In another example, an additional ALF data may be included in the header information based on a determination that a value of a flag indicating whether to use the ALF data in the header information is 1.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding apparatus and/or decoding apparatus according to the present document is, for example, may be included in the apparatus that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 17:
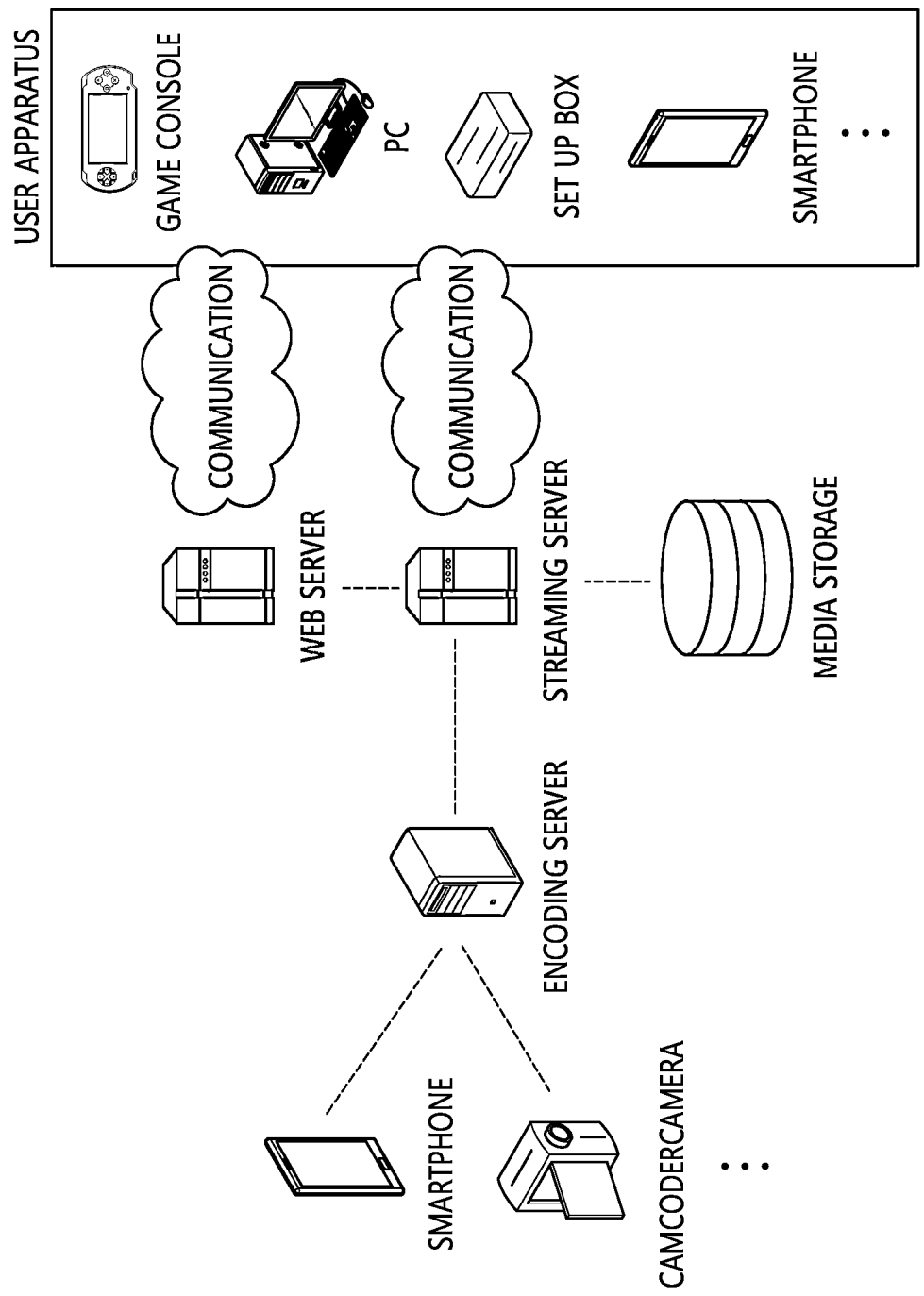
FIG. 17 shows an example of a content streaming system to which embodiments disclosed in the present document may be applied.

FIG. 17 shows an example of a content streaming system to which embodiments disclosed in the present document may be applied.

Referring to FIG. 17, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. An image decoding method performed by a decoding apparatus, the method comprising:
   receiving image information through a bitstream;
   generating luma prediction samples of a current block based on the image information;
   performing a luma mapping with chroma scaling (LMCS) process for the luma prediction samples; and
   reconstructing samples of the current block based on the mapped luma prediction samples,
   wherein the performing the LMCS process includes:
   deriving LMCS indices for the LMCS; and
   generating the mapped luma prediction samples based on the luma prediction samples and the LMCS indices,
   wherein the image information includes adaptation parameter set (APS),
   wherein the APS includes LMCS data field,
   wherein a LMCS data is derived based on the LMCS data field,
   wherein the LMCS indices are derived based on the LMCS data.

2. The method of claim 1, wherein the image information includes header information,
   wherein the header information includes a LMCS enabled flag and LMCS related APS ID information, and
   wherein the LMCS related APS ID information represents an ID of the APS including the LMCS data field.

3. The method of claim 2, wherein the header information includes a flag indicating whether to use the LMCS data field in the header information, and
   wherein based on the flag indicating whether to use the LMCS data field in the header information, the LMCS data included in the APS indicated by the LMCS related APS ID information is used for the LMCS.

4. The method of claim 3, wherein based on a determination that a value of the flag indicating whether to use the LMCS data field in the header information is 0, the LMCS data, which is derived based on the LMCS data field included in the APS indicated by the LMCS related APS ID information, is used for the LMCS, and
   wherein based on a determination that the value of a flag indicating whether to use the LMCS data field in the header information is 1, an additional LMCS data field is included in the header information.

5. The method of claim 2, wherein the method further comprises performing chroma residual scaling based on the mapped prediction samples and a chroma residual scaling flag,
   wherein the chroma residual scaling flag is included in the header information, and
   wherein the chroma residual scaling flag is signaled based on a determination that a value of the LMCS enabled flag is 1.

6. The method of claim 2, wherein the method further comprises:
   generating reconstructed samples of the current block based on the mapped luma prediction samples; and
   performing an adaptive loop filter (ALF) process on the reconstructed samples,
   wherein performing the ALF process comprises:
   deriving filter coefficients for the ALF process; and
   generating modified reconstructed samples based on the reconstructed samples and the filter coefficients,
   wherein the APS includes ALF data, and
   wherein the filter coefficients are derived by using the ALF data.

7. The method of claim 6, wherein the header information includes an ALF enabled flag and ALF related APS ID information, and
   wherein the ALF related APS ID information represents the ID of the APS including the ALF data.

8. The method of claim 7, wherein the header information includes a flag indicating whether to use the ALF data in the header information,
   wherein based on the flag indicating whether to use the ALF data in the header information, the ALF data included in the APS indicated by the ALF related APS ID information is used for deriving the filter coefficients.

9. The method of claim 8, wherein based on a determination that a value of the flag indicating whether to use the ALF data in the header information is 0, the ALF data included in the APS indicated by the ALF related APS ID information is used for deriving the filter coefficients, and
   an additional ALF data is included in the header information based on a determination that a value of a flag indicating whether to use the ALF data in the header information is 1.

10. An image encoding method performed by an encoding apparatus, the method comprising:
    generating luma prediction samples of a current block in a current picture;
    deriving luma mapping with chroma scaling (LMCS) indices for LMCS on the luma prediction samples;
    generating mapped luma prediction samples based on the luma prediction samples and the LMCS indices;
    generating LMCS related information; and encoding image information including prediction mode information for generating the luma prediction samples and the LMCS related information, wherein samples of the current block are reconstructed based on the mapped luma prediction samples, wherein the image information includes an adaptation parameter set (APS), wherein the APS includes LMCS data field, wherein a LMCS data is derived based on the LMCS data field, wherein the LMCS indices are derived based on the LMCS data.

11. The method of claim 10, wherein the image information includes header information, wherein the header information includes a LMCS enabled flag and LMCS related APS ID information, and wherein the LMCS related APS ID information represents an ID of the APS including the LMCS data field.

12. The method of claim 11, wherein the header information includes a flag indicating whether to use the LMCS data field in the header information, and wherein based on the flag indicating whether to use the LMCS data field in the header information, the LMCS data included in the APS indicated by the LMCS related APS ID information is used for the LMCS.

13. The method of claim 12, wherein based on a determination that a value of the flag indicating whether to use the LMCS data field in the header information is 0, the LMCS data, which is derived based on the LMCS data field included in the APS indicated by the LMCS related APS ID information, is used for the LMCS, and wherein based on a determination that the value of a flag indicating whether to use the LMCS data field in the header information is 1, an additional LMCS data field is included in the header information.

14. The method of claim 11, wherein the method further comprises:

generating reconstructed samples of the current block based on the mapped luma prediction samples; and deriving filter coefficients for an adaptive loop filter (ALF) process on the reconstructed samples;

generating modified reconstructed samples based on the reconstructed samples and the filter coefficients;

generating ALF data, wherein the APS includes the ALF data, and wherein the ALF data includes information for deriving the filter coefficients.

15. A computer-readable digital storage medium, storing encoded information causing a decoding apparatus to perform an image decoding method, the method comprising:

receiving image information through a bitstream;

generating luma prediction samples of a current block based on the image information;

performing a luma mapping with chroma scaling (LMCS) process for the luma prediction samples; and reconstructing samples of the current block based on the mapped luma prediction samples, wherein the performing the LMCS process includes:

deriving LMCS data indices for the LMCS; and generating the mapped luma prediction samples based on the luma prediction samples and the LMCS indices, wherein the image information includes adaptation parameter set (APS), wherein the APS includes LMCS data field, wherein a LMCS data is derived based on the LMCS data field, wherein the LMCS indices are derived based on the LMCS data.

* * * * *